US012808836B2

(12) United States Patent
Hashikawa et al.

(10) Patent No.: US 12,808,836 B2
(45) Date of Patent: Nov. 24, 2026

(54) SENSOR ELEMENT AND GAS SENSOR

(71) Applicant: NGK INSULATORS, LTD., Nagoya (JP)

(72) Inventors: Ryo Hashikawa, Nagoya (JP); Yusuke Watanabe, Nagoya (JP); Shingo Tanaka, Kasugai (JP); Kazuki Itami, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 207 days.

(21) Appl. No.: 18/744,756

(22) Filed: Jun. 17, 2024

(65) Prior Publication Data

US 2024/0337621 A1 Oct. 10, 2024

Related U.S. Application Data

(63) Continuation of application No. PCT/JP2022/043887, filed on Nov. 29, 2022.

(30) Foreign Application Priority Data

Dec. 22, 2021 (JP) ................................ 2021-208247

(51) Int. Cl.
*G01N 27/407* (2006.01)
*G01N 27/30* (2006.01)
*G01N 27/41* (2006.01)

(52) U.S. Cl.
CPC ....... *G01N 27/4072* (2013.01); *G01N 27/301* (2013.01); *G01N 27/41* (2013.01)

(58) Field of Classification Search
None
See application file for complete search history.

(56) References Cited

U.S. PATENT DOCUMENTS

2002/0175077 A1 11/2002 Wahl et al.
2018/0284056 A1 10/2018 Watanabe
(Continued)

FOREIGN PATENT DOCUMENTS

JP 03-61565 U 6/1991
JP 2002-310988 A 10/2002
(Continued)

OTHER PUBLICATIONS

International Preliminary Report on Patentability received in corresponding International Application No. PCT/JP2022/043887 dated Jul. 4, 2024.

(Continued)

*Primary Examiner* — J. Christopher Ball
(74) *Attorney, Agent, or Firm* — MATTINGLY & MALUR, PC

(57) ABSTRACT

A sensor element includes an element body provided with a measurement-object gas flow section therein, a measurement electrode, a reference electrode, a reference-gas introduction section, and a heater that heats the element body. The reference-gas introduction section has a reference-gas introduction space that is open outward of the element body and that introduces a reference gas into the element body, and also has a porous reference-gas introduction layer that causes the reference gas to flow from the reference-gas introduction space to the reference electrode. The reference-gas introduction layer has a first porous region and a second porous region in a path segment serving as a reference-gas path between the reference-gas introduction space and the reference electrode. The second porous region has a low porosity region with a lower porosity than the first porous region and is disposed closer to the reference electrode relative to the first porous region.

19 Claims, 10 Drawing Sheets

(56) References Cited

U.S. PATENT DOCUMENTS

| | | | |
|---|---|---|---|
| 2020/0191744 | A1 | 6/2020 | Watanabe |
| 2021/0302363 | A1 | 9/2021 | Watanabe |

FOREIGN PATENT DOCUMENTS

| | | | |
|---|---|---|---|
| JP | 2018-169328 | A | 11/2018 |
| JP | 2019-86301 | A | 6/2019 |
| JP | 2020-094899 | A | 6/2020 |
| JP | 2021-156689 | A | 10/2021 |

OTHER PUBLICATIONS

International Search Report of PCT/JP2022/043887 dated Feb. 14, 2023.
Written Opinion of the international Searching Authority of PCT/JP2022/043887 dated Feb. 14, 2023.

SENSOR ELEMENT AND GAS SENSOR

CROSS-REFERENCE TO RELATED APPLICATION

This application is a continuation application of PCT/JP2022/043887, filed on Nov. 29, 2022, which claims the benefit of priority of Japanese Patent Application No. 2021-208247, filed on Dec. 22, 2021, the entire contents of which are incorporated herein by reference.

BACKGROUND OF THE INVENTION

1. Field of the Invention

The present invention relates to sensor elements and gas sensors.

2. Description of the Related Art

A known sensor element in the related art is used in a gas sensor that detects the concentration of a specific gas, such as $NO_x$, in a measurement-object gas, such as exhaust gas of an automobile. For example, Patent Literature 1 describes a sensor element including an element body, a measurement electrode, a reference electrode, and a reference-gas introduction section. The element body has an oxygen-ion-conductive solid electrolyte layer and is provided therein with a measurement-object gas flow section that receives a measurement-object gas and that causes the measurement-object gas to flow therethrough. The measurement electrode is disposed on an inner peripheral surface of the measurement-object gas flow section. The reference electrode is disposed inside the element body. The reference-gas introduction section receives a reference gas (e.g. atmospheric gas) serving as a reference for detecting the specific gas concentration in the measurement-object gas and causes the reference gas to flow to the reference electrode. The reference-gas introduction section has a porous reference-gas introduction layer. The specific gas concentration in the measurement-object gas can be detected based on an electromotive force occurring between the reference electrode and the measurement electrode of this sensor element. Furthermore, the specific gas concentration is measured in a state where the solid electrolyte is activated by heating the sensor element to a predetermined driving temperature (e.g., 800° C.) using a heater contained in the sensor element.

CITATION LIST

Patent Literature

PTL 1: JP 2020-094899 A

SUMMARY OF THE INVENTION

During a period in which the sensor element is not driven, the porous reference-gas introduction layer in the reference-gas introduction section may sometimes adsorb water from the outside. Because the sensor element is heated by the heater when the driving of the sensor element is started, the water in the reference-gas introduction layer becomes gas and is released outward of the sensor element. However, until the water is released, the water in the gaseous state exists, sometimes causing the oxygen concentration around the reference electrode to decrease. Thus, the time (referred to as "stabilization period" hereinafter) it takes for the potential of the reference electrode to become stable from when the driving of the sensor element is started is sometimes extended. It is conceivable to reduce the diffusion resistance of the reference-gas introduction section to shorten the stabilization period. However, in that case, if a contaminant enters the reference-gas introduction section from outside the sensor element, the oxygen concentration around the reference electrode decreases, sometimes causing the measurement accuracy for the specific gas concentration to deteriorate.

The present invention has been made to solve the aforementioned problems, and a main object thereof is to shorten the stabilization period of the sensor element and to enhance the resistance to contaminants.

In order to achieve the aforementioned main object, the present invention employs the following solutions.

[1] A sensor element according to the present invention includes: an element body having an oxygen-ion-conductive solid electrolyte layer and provided therein with a measurement-object gas flow section, the measurement-object gas flow section receiving a measurement-object gas and causing the measurement-object gas to flow therethrough; a measurement electrode disposed in the measurement-object gas flow section; a reference electrode disposed inside the element body; a reference-gas introduction section having a reference-gas introduction space and a porous reference-gas introduction layer, the reference-gas introduction space being open outward of the element body and introducing a reference gas serving as a reference for detecting a specific gas concentration in the measurement-object gas into the element body, the porous reference-gas introduction layer causing the reference gas to flow from the reference-gas introduction space to the reference electrode; and a heater that heats the element body. The reference-gas introduction layer has a first porous region and a second porous region in a path of the reference gas between the reference-gas introduction space and the reference electrode. The second porous region has a low porosity region with a lower porosity than the first porous region and is disposed closer to the reference electrode relative to the first porous region.

In this sensor element, the reference-gas introduction layer has the second porous region having the low porosity region with the low porosity. Accordingly, even when a contaminant enters the reference-gas introduction section from outside the sensor element, the oxygen concentration around the reference electrode is less likely to decrease. Furthermore, the reference-gas introduction layer has the first porous region with a higher porosity than the low porosity region at the entrance side of the reference-gas introduction section relative to the second porous region. Accordingly, water adsorbed into the reference-gas introduction layer when the sensor element is not driven is readily diffused outward from the sensor element during the driving of the sensor element.

Therefore, the stabilization period of the sensor element can be shortened. Accordingly, this sensor element achieves a shorter stabilization period and higher resistance to contaminants. The second porous region may entirely be the low porosity region, or may have the low porosity region and a high porosity region with a porosity higher than or equal to the porosity of the first porous region.

[2] In the aforementioned sensor element (i.e., the sensor element according to [1]), a ratio Rp2/Rp1 between a diffusion resistance Rp1 per unit length of the first porous region and a diffusion resistance Rp2 per unit length of the second porous region may be between 5 and 50 inclusive. When the ratio Rp2/Rp1 is 5 or higher, the sensor element has further enhanced resistance to contaminants. When the ratio Rp2/Rp1 is 50 or lower, the stabilization period of the sensor element is further shortened.

[3] In the aforementioned sensor element (i.e., the sensor element according to [1] or [2]), a ratio Rp1/Rp0 between a diffusion resistance Rp0 per unit length of the reference-gas introduction space and a diffusion resistance Rp1 per unit length of the first porous region may be between 2 and 10 inclusive. When the ratio Rp1/Rp0 is 2 or higher, the sensor element has further enhanced resistance to contaminants. When the ratio Rp1/Rp0 is 10 or lower, the stabilization period of the sensor element is further shortened.

[4] In the aforementioned sensor element (i.e., the sensor element according to any one of [1] to [3]), a diffusion resistance Ra of the reference-gas introduction section may be 1200 $mm^{-1}$ or lower. Accordingly, the stabilization period of the sensor element is further shortened.

[5] In the aforementioned sensor element (i.e., the sensor element according to any one of [1] to [4]), a width W2 of the low porosity region may be 90% or more of a width W1 of the first porous region and 90% or more of a width Wr of the reference electrode. Accordingly, the effect for enhancing the resistance of the sensor element to contaminants by the low porosity region can be achieved more reliably. If the entire second porous region is the low porosity region, the width of the second porous region directly serves as the width W2.

[6] In the aforementioned sensor element (i.e., the sensor element according to any one of [1] to [5]), in plan view, an area S2 of the low porosity region may be 45% or more of an area Sw of a segment between the reference-gas introduction space and the reference electrode in the reference-gas introduction layer. Accordingly, the effect for enhancing the resistance to contaminants by the low porosity region can be achieved more reliably. If the entire second porous region is the low porosity region, the area of the second porous region directly serves as the area S2.

[7] In the aforementioned sensor element (i.e., the sensor element according to any one of [1] to [6]), the second porous region may have the low porosity region and a high porosity region with a porosity higher than or equal to a porosity of the first porous region, and the low porosity region and the high porosity region may be arranged in an overlapping manner in a thickness direction of the reference-gas introduction layer.

[8] In the aforementioned sensor element (i.e., the sensor element according to [7]), a thickness T2a of the low porosity region may be 50% or more of a thickness T2 of the second porous region.

[9] In the aforementioned sensor element (i.e., the sensor element according to [7]), a thickness T2a of the low porosity region may be 90% or more of a thickness T2 of the second porous region.

[10] A gas sensor according to the present invention includes the sensor element according to any one of the above aspects (i.e., the sensor element according to any one of [1] to [9]). Therefore, this gas sensor achieves advantages similar to those of the aforementioned sensor element according to the present invention. For example, the advantages achieved include a shorter stabilization period of the sensor element and higher resistance of the sensor element to contaminants.

DETAILED DESCRIPTION OF THE INVENTION

Figure 1:
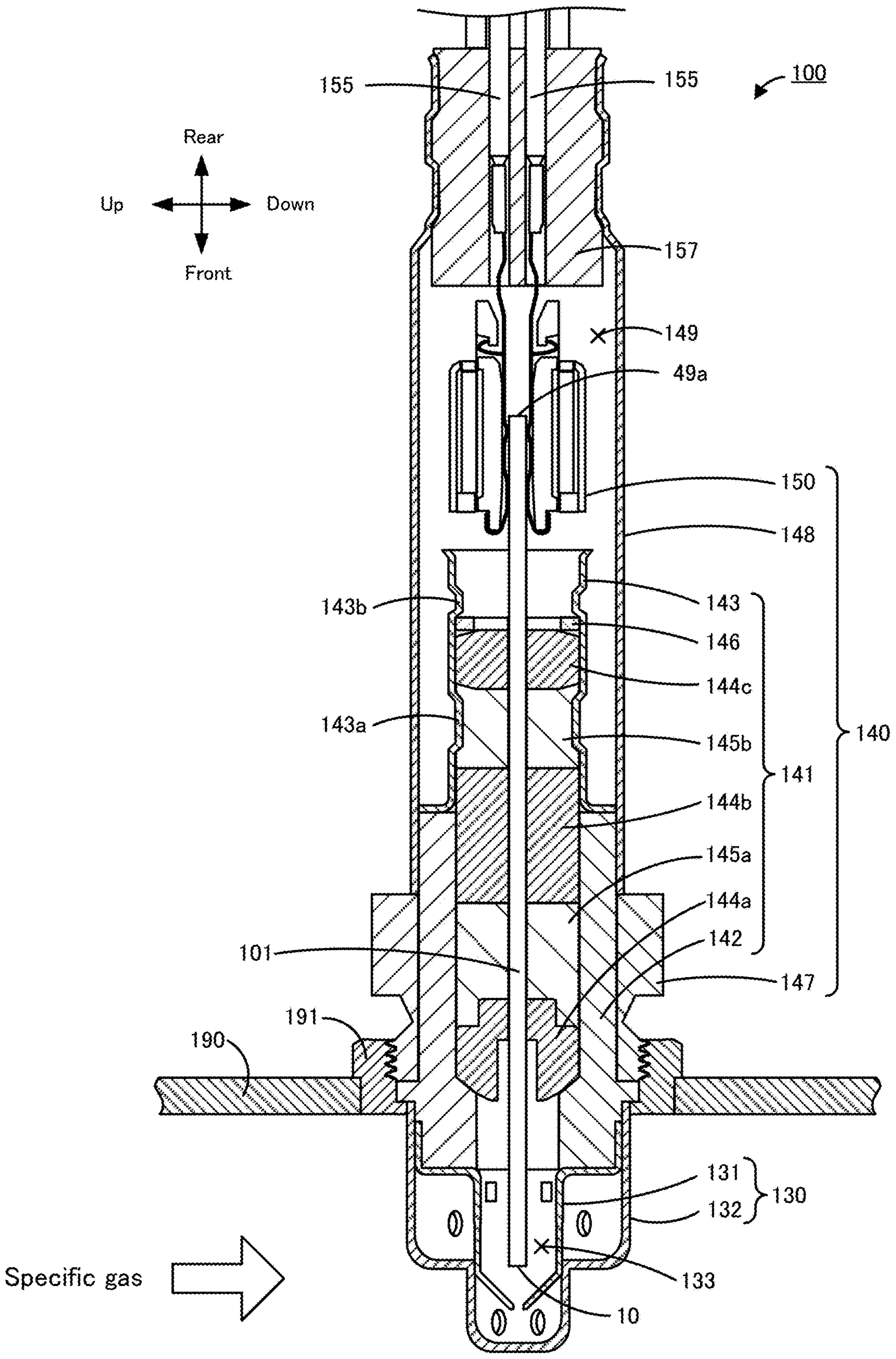
FIG. 1 is a vertical sectional view of a gas sensor 100.
Figure 2:
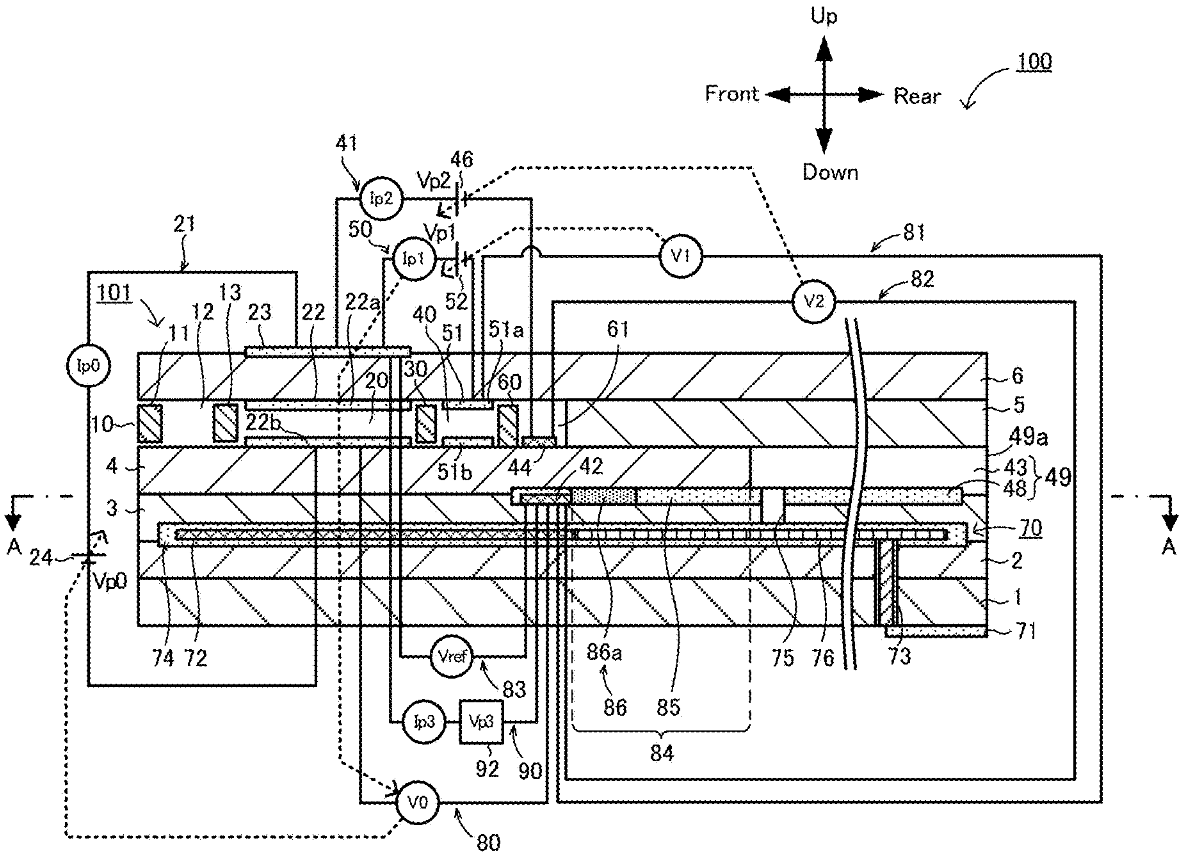
FIG. 2 is a schematic cross-sectional view schematically illustrating an example of the configuration of a sensor element 101.
Figure 3:
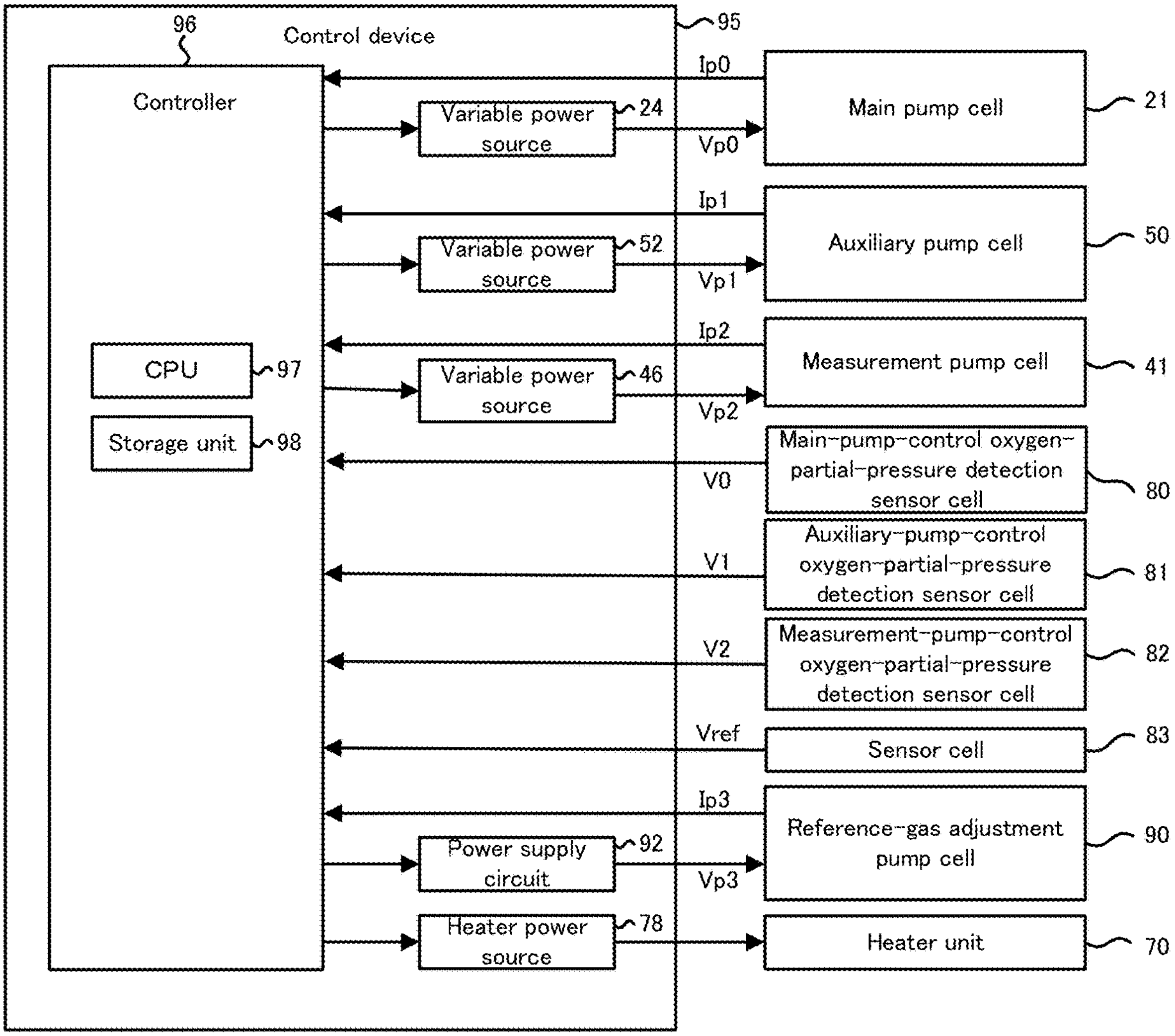
FIG. 3 is a block diagram illustrating an electrical connection relationship between a control device 95 and each cell.
Figure 4:
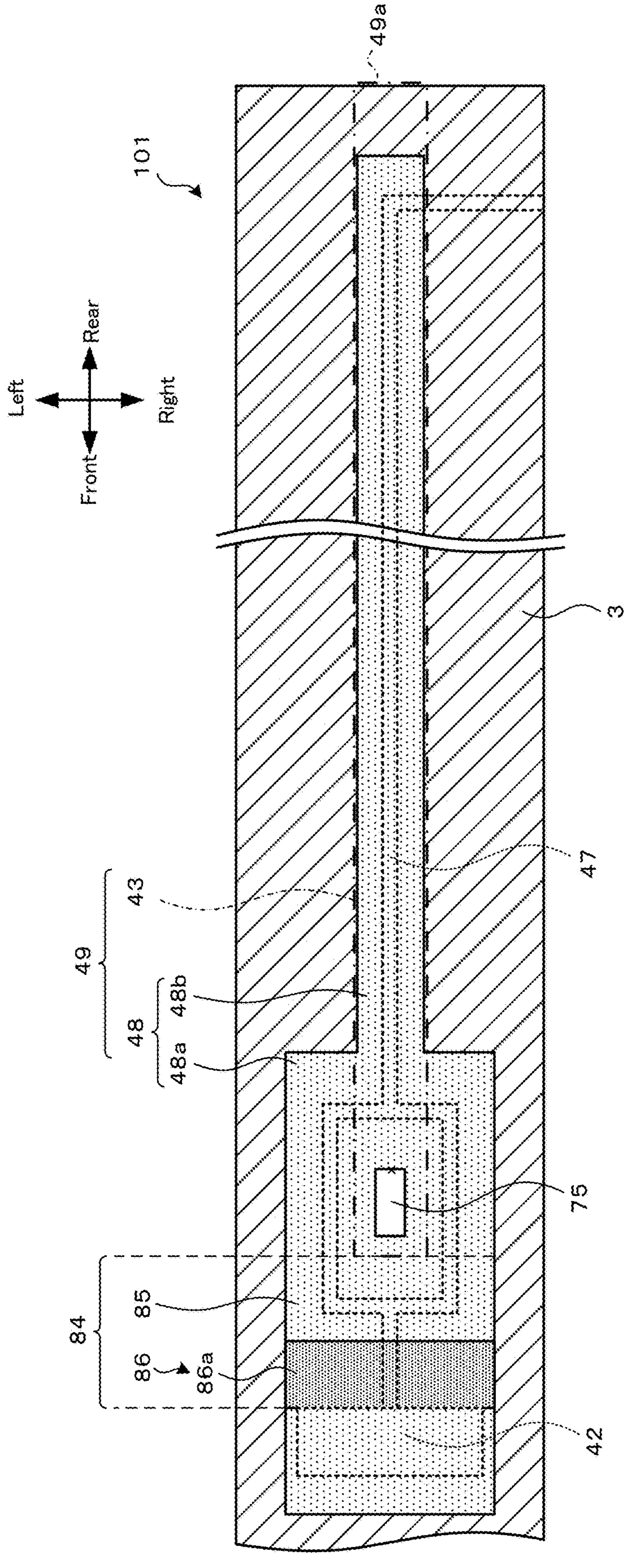
FIG. 4 is a cross-sectional view taken along line A-A in FIG. 2.

Next, embodiments of the present invention will be described with reference to the drawings. FIG. 1 is a vertical sectional view of a gas sensor 100 according to an embodiment of the present invention. FIG. 2 is a schematic cross-sectional view schematically illustrating an example of the configuration of a sensor element 101 included in the gas sensor 100. FIG. 3 is a block diagram illustrating an electrical connection relationship between a control device 95 and each cell. FIG. 4 is a cross-sectional view taken along line A-A in FIG. 2. The sensor element 101 has a long rectangular-prismatic shape. The longitudinal direction (i.e., the left-right direction in FIG. 2) of the sensor element 101 is defined as a front-rear direction, and the thickness direction (i.e., the up-down direction in FIG. 2) of the sensor element 101 is defined as an up-down direction. Furthermore, the width direction (i.e., a direction orthogonal to the front-rear direction and the up-down direction) of the sensor element 101 is defined as a left-right direction.

As shown in FIG. 1, the gas sensor 100 includes the sensor element 101, a protection cover 130 that protects the front end of the sensor element 101, and a sensor assembly 140 including a connector 150 conductive with the sensor element 101. The gas sensor 100 is attached to a pipe 190, such as an exhaust gas pipe of a vehicle, as shown in the drawing, and is used for measuring the concentration of a specific gas, such as $NO_x$ or $O_2$, contained in exhaust gas as a measurement-object gas. In this embodiment, the gas sensor 100 measures the $NO_x$ concentration as the specific gas concentration.

The protection cover 130 includes a bottomed cylindrical inner protection cover 131 that covers the front end of the sensor element 101, and a bottomed cylindrical outer protection cover 132 that covers the inner protection cover 131. The inner protection cover 131 and the outer protection cover 132 each have a plurality of holes for causing the measurement-object gas to flow into the protection cover 130. A sensor element chamber 133 is provided as a space surrounded by the inner protection cover 131, and the front end of the sensor element 101 is disposed in this sensor element chamber 133.

The sensor assembly 140 includes an element sealing unit 141 that seals and secures the sensor element 101, a bolt 147 attached to the element sealing unit 141, an outer cylinder 148, and the connector 150 that is in contact with and electrically connected to connector electrodes (not shown) provided on surfaces (i.e., upper and lower surfaces) at the rear end of the sensor element 101 (only a heater connector electrode 71 to be described later is shown in FIG. 2).

The element sealing unit 141 includes a cylindrical main fitting 142, a cylindrical inner cylinder 143 welded and secured coaxially to the main fitting 142, and ceramic supporters 144*a*, 144*b* and 144*c*, green compacts 145*a* and 145*b*, and a metal ring 146 that are sealed in a through-hole within the main fitting 142 and the inner cylinder 143. The sensor element 101 is located on the central axis of the element sealing unit 141 and extends through the element sealing unit 141 in the front-rear direction. The inner cylinder 143 has a reduced-diameter section 143*a* for pressing the green compact 145*b* toward the central axis of the inner cylinder 143 and a reduced-diameter section 143*b* for pressing the ceramic supporters 144*a*, 144*b* and 144*c* and the green compacts 145*a* and 145*b* forward via the metal ring 146. The green compacts 145*a* and 145*b* are compressed between the main fitting 142, the inner cylinder 143, and the sensor element 101 by the pressing forces from the reduced-diameter sections 143*a* and 143*b*, so that the green compacts 145*a* and 145*b* seal between the sensor element chamber 133 in the protection cover 130 and a space 149 in the outer cylinder 148, and also secure the sensor element 101.

The bolt 147 is secured coaxially to the main fitting 142 and has a male threaded section around the outer peripheral surface thereof. The male threaded section of the bolt 147 is inserted into a securing member 191 having a female threaded section in the inner peripheral surface thereof and welded to the pipe 190. Accordingly, the gas sensor 100 is secured to the pipe 190 in a state where the front end of the sensor element 101 and a part of the protection cover 130 of the gas sensor 100 protrude into the pipe 190.

The outer cylinder 148 covers the inner cylinder 143, the sensor element 101, and the connector 150, and a plurality of lead wires 155 connected to the connector 150 are routed outward from the rear end. The lead wires 155 are conductive with electrodes (to be described later) of the sensor element 101 via the connector 150. A gap between the outer cylinder 148 and the lead wires 155 is sealed by a rubber stopper 157. The space 149 in the outer cylinder 148 is filled with a reference gas (i.e., atmospheric gas in this embodiment). The rear end of the sensor element 101 is disposed in this space 149.

As shown in FIG. 2, the sensor element 101 has a layered body obtained by stacking six layers, namely, a first substrate layer 1, a second substrate layer 2, a third substrate layer 3, a first solid electrolyte layer 4, a spacer layer 5, and a second solid electrolyte layer 6 that are formed of oxygen-ion-conductive solid electrolyte layers composed of, for example, zirconia ($ZrO_2$), in that order from below in the drawing. The solid electrolyte used for forming each of these six layers is dense and hermetic. For example, the sensor element 101 is manufactured by performing predetermining processing and printing of a circuit pattern on ceramic green sheets corresponding to the individual layers, subsequently stacking the sheets, and then combining the sheets by calcination.

At one end (i.e., left end in FIG. 2) of the sensor element 101, a gas inlet 10, a first diffusion controlling section 11, a buffer space 12, a second diffusion controlling section 13, a first internal cavity 20, a third diffusion controlling section 30, a second internal cavity 40, a fourth diffusion controlling section 60, and a third internal cavity 61 are provided next to one another between the lower surface of the second solid electrolyte layer 6 and the upper surface of the first solid electrolyte layer 4 in a conductive manner in that order.

The gas inlet 10, the buffer space 12, the first internal cavity 20, the second internal cavity 40, and the third internal cavity 61 are spaces formed inside the sensor element 101 by hollowing out the spacer layer 5 and each have an upper side defined by the lower surface of the second solid electrolyte layer 6, a lower side defined by the upper surface of the first solid electrolyte layer 4, and lateral sides defined by the side surfaces of the spacer layer 5.

The first diffusion controlling section 11, the second diffusion controlling section 13, and the third diffusion controlling section 30 are each provided as two horizontally-long slits (the openings of which extend longitudinally in a direction orthogonal to the drawing). The fourth diffusion controlling section 60 is provided as a single horizontally-long slit (the opening of which extends longitudinally in the direction orthogonal to the drawing) serving as a gap with respect to the lower surface of the second solid electrolyte layer 6. A section extending from the gas inlet 10 to the third internal cavity 61 is also referred to as a measurement-object gas flow section.

The sensor element 101 includes a reference-gas introduction section 49 that allows the reference gas to flow from outside the sensor element 101 to a reference electrode 42 when the $NO_x$ concentration is to be measured. The reference-gas introduction section 49 has a reference-gas introduction space 43 and a reference-gas introduction layer 48. The reference-gas introduction space 43 is provided inward from the rear end surface of the sensor element 101. The reference-gas introduction space 43 is provided at a position between the upper surface of the third substrate layer 3 and the lower surface of the spacer layer 5 and has lateral sides defined by the side surfaces of the first solid electrolyte layer 4. The reference-gas introduction space 43 has an opening at the rear end surface of the sensor element 101, and this opening functions as an entrance 49*a* for the reference-gas introduction section 49. The entrance 49*a* is exposed to the space 149 (see FIG. 1). The reference gas is introduced into the reference-gas introduction space 43 through this entrance 49*a*. The reference-gas introduction section 49 introduces the reference gas to the reference electrode 42 while applying a predetermined diffusion resistance to the reference gas introduced through the entrance 49*a*. In this embodiment, the reference gas is the atmospheric gas (i.e., atmosphere in the space 149 in FIG. 1).

The reference-gas introduction layer 48 is provided between the upper surface of the third substrate layer 3 and the lower surface of the first solid electrolyte layer 4. The reference-gas introduction layer 48 is a porous body composed of a ceramic material, such as alumina. The upper surface of the reference-gas introduction layer 48 is partially exposed to the reference-gas introduction space 43. The reference-gas introduction layer 48 is provided to cover the reference electrode 42. The reference-gas introduction layer 48 allows the reference gas to flow from the reference-gas introduction space 43 to the reference electrode 42.

The reference electrode 42 is interposed between the upper surface of the third substrate layer 3 and the first solid electrolyte layer 4 and is surrounded by the reference-gas introduction layer 48 connected to the reference-gas introduction space 43, as mentioned above. Furthermore, as will be described later, the reference electrode 42 can be used for measuring the oxygen concentration (oxygen partial pressure) in the first internal cavity 20, the second internal cavity 40, and the third internal cavity 61. The reference electrode 42 is provided as a porous cermet electrode (e.g., a cermet electrode composed of Pt and $ZrO_2$).

In the measurement-object gas flow section, the gas inlet 10 is open to an external space, such that the measurement-object gas is taken into the sensor element 101 from the external space through the gas inlet 10. The first diffusion controlling section 11 applies a predetermined diffusion resistance to the measurement-object gas taken in through the gas inlet 10. The buffer space 12 is provided for guiding the measurement-object gas introduced by the first diffusion controlling section 11 to the second diffusion controlling section 13. The second diffusion controlling section 13 applies a predetermined diffusion resistance to the measurement-object gas introduced to the first internal cavity 20 from the buffer space 12. When the measurement-object gas is to be introduced to the first internal cavity 20 from outside the sensor element 101, the measurement-object gas quickly taken into the sensor element 101 through the gas inlet 10 due to pressure fluctuation (i.e., pulsation of exhaust pressure if the measurement-object gas is exhaust gas of an automobile) of the measurement-object gas in the external space is not directly introduced to the first internal cavity 20 but is introduced to the first internal cavity 20 after the pressure fluctuation of the measurement-object gas is negated by traveling through the first diffusion controlling section 11, the buffer space 12, and the second diffusion controlling section 13. Accordingly, the pressure fluctuation of the measurement-object gas to be introduced to the first internal cavity 20 can be made substantially negligible. The first internal cavity 20 is provided as a space for adjusting the oxygen partial pressure in the measurement-object gas introduced via the second diffusion controlling section 13. The oxygen partial pressure is adjusted by actuating a main pump cell 21.

The main pump cell 21 is an electrochemical pump cell constituted of an inner pump electrode 22 having a ceiling electrode 22*a* provided substantially over the entire lower surface of the second solid electrolyte layer 6 facing the first internal cavity 20, an outer pump electrode 23 provided in a region corresponding to the ceiling electrode 22*a* on the upper surface of the second solid electrolyte layer 6 in a manner such that the outer pump electrode 23 is exposed to the external space (i.e., the sensor element chamber 133 in FIG. 1), and the second solid electrolyte layer 6 interposed between these electrodes.

The inner pump electrode 22 is provided astride the upper and lower solid electrolyte layers (i.e., the second solid electrolyte layer 6 and the first solid electrolyte layer 4) that define the first internal cavity 20, and the spacer layer 5 that provides sidewalls. In detail, the lower surface of the second solid electrolyte layer 6 that provides a ceiling surface for the first internal cavity 20 is provided with the ceiling electrode 22*a*, the upper surface of the first solid electrolyte layer 4 that provides a bottom surface is provided with a bottom electrode 22*b*, and side electrodes (not shown) connecting the ceiling electrode 22*a* and the bottom electrode 22*b* are provided on sidewalls (inner surfaces) of the spacer layer 5 that serve as opposite sidewalls for the first internal cavity 20, such that the inner pump electrode 22 is disposed in a tunnel-like structure in a region where the side electrodes are arranged.

The inner pump electrode 22 and the outer pump electrode 23 are provided as porous cermet electrodes (e.g., cermet electrodes composed of Pt and $ZrO_2$ and containing 1% of Au). The inner pump electrode 22 that comes into contact with the measurement-object gas is formed by using a material with a lowered reduction ability against the $NO_x$ component in the measurement-object gas.

In the main pump cell 21, a desired pump voltage Vp0 is applied between the inner pump electrode 22 and the outer pump electrode 23 so that a pump current Ip0 flows in the positive direction or the negative direction between the inner pump electrode 22 and the outer pump electrode 23, whereby the oxygen in the first internal cavity 20 can be pumped out to the external space or the oxygen in the external space can be pumped into the first internal cavity 20.

Furthermore, in order to detect the oxygen concentration (oxygen partial pressure) in the atmosphere within the first internal cavity 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main-pump-control oxygen-partial-pressure detection sensor cell 80.

The oxygen concentration (oxygen partial pressure) in the first internal cavity 20 can be determined by measuring an electromotive force (voltage V0) in the main-pump-control oxygen-partial-pressure detection sensor cell 80. Furthermore, feedback control is performed on the pump voltage Vp0 of a variable power source 24 so that the voltage V0 becomes a target value, whereby the pump current Ip0 is controlled. Accordingly, the oxygen concentration in the first internal cavity 20 can be maintained at a predetermined fixed value.

The third diffusion controlling section 30 applies a predetermined diffusion resistance to the measurement-object gas, the oxygen concentration (oxygen partial pressure) of which has been controlled in the first internal cavity 20 in accordance with the operation of the main pump cell 21, and guides the measurement-object gas to the second internal cavity 40.

The second internal cavity 40 is provided as a space where an auxiliary pump cell 50 further adjusts the oxygen partial pressure of the measurement-object gas that has preliminarily undergone oxygen concentration (oxygen partial pressure) adjustment in the first internal cavity 20 and that has subsequently been introduced via the third diffusion controlling section 30. Accordingly, the oxygen concentration in the second internal cavity 40 can be maintained at a fixed level with high accuracy, thereby allowing for highly-accurate $NO_x$ concentration measurement in the gas sensor 100.

The auxiliary pump cell 50 is an auxiliary electrochemical pump cell constituted of an auxiliary pump electrode 51 having a ceiling electrode 51*a* provided substantially over the entire lower surface of the second solid electrolyte layer 6 facing the second internal cavity 40, the outer pump electrode 23 (but not limited to the outer pump electrode 23 and may possibly be an appropriate electrode at the outer side of the sensor element 101), and the second solid electrolyte layer 6.

The auxiliary pump electrode 51 is disposed within the second internal cavity 40 in a tunnel-like structure similar to the aforementioned inner pump electrode 22 provided in the first internal cavity 20. Specifically, the tunnel-like structure is provided such that the second solid electrolyte layer 6 that provides a ceiling surface for the second internal cavity 40 is provided with the ceiling electrode 51*a*, the first solid electrolyte layer 4 that provides a bottom surface for the second internal cavity 40 is provided with a bottom electrode 51*b*, and side electrodes (not shown) that connect the ceiling electrode 51*a* and the bottom electrode 51*b* are provided on opposite wall surfaces of the spacer layer 5 that provide sidewalls for the second internal cavity 40. The auxiliary pump electrode 51 is similar to the inner pump electrode 22 in being formed by using a material with a lowered reduction ability against the $NO_x$ component in the measurement-object gas.

In the auxiliary pump cell 50, a desired voltage Vp1 is applied between the auxiliary pump electrode 51 and the outer pump electrode 23 so that the oxygen in the atmosphere within the second internal cavity 40 can be pumped out to the external space or the oxygen can be pumped into the second internal cavity 40 from the external space.

Furthermore, in order to control the oxygen partial pressure in the atmosphere within the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, that is, an auxiliary-pump-control oxygen-partial-pressure detection sensor cell 81.

The auxiliary pump cell 50 performs pumping in accordance with a variable power source 52 that is voltage-controlled based on an electromotive force (voltage V1) detected by the auxiliary-pump-control oxygen-partial-pressure detection sensor cell 81. Accordingly, the oxygen partial pressure in the atmosphere within the second internal cavity 40 is controlled to a low partial pressure that substantially has no effect on $NO_x$ measurement.

In addition, a pump current Ip1 is used for controlling the electromotive force of the main-pump-control oxygen-partial-pressure detection sensor cell 80. In detail, the pump current Ip1 is input as a control signal to the main-pump-control oxygen-partial-pressure detection sensor cell 80, and the voltage V0 is controlled to the aforementioned target value, whereby the gradient of the oxygen partial pressure in the measurement-object gas introduced to the second internal cavity 40 from the third diffusion controlling section 30 is controlled such that the gradient is constantly fixed. When the gas sensor 100 is used as a $NO_x$ sensor, the oxygen concentration within the second internal cavity 40 is maintained at a fixed value of about 0.001 ppm in accordance with the functions of the main pump cell 21 and the auxiliary pump cell 50.

The fourth diffusion controlling section 60 applies a predetermined diffusion resistance to the measurement-object gas, the oxygen concentration (oxygen partial pressure) of which has been controlled in the second internal cavity 40 in accordance with the operation of the auxiliary pump cell 50, and guides the measurement-object gas to the third internal cavity 61. The fourth diffusion controlling section 60 has a role of limiting the amount of $NO_x$ flowing into the third internal cavity 61.

The third internal cavity 61 is provided as a space where a process for measuring the nitrogen oxide ($NO_x$) concentration in the measurement-object gas is performed on the measurement-object gas that has preliminarily undergone oxygen concentration (oxygen partial pressure) adjustment in the second internal cavity 40 and that has subsequently been introduced via the fourth diffusion controlling section 60. The $NO_x$ concentration is measured mainly in the third internal cavity 61 in accordance with the operation of a measurement pump cell 41.

The measurement pump cell 41 measures the $NO_x$ concentration in the measurement-object gas within the third internal cavity 61. The measurement pump cell 41 is an electrochemical pump cell constituted of a measurement electrode 44 provided on the upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode composed of a material with a higher reduction ability against the $NO_x$ component in the measurement-object gas than the inner pump electrode 22. The measurement electrode 44 also functions as a $NO_x$ reduction catalyst that reduces the $NO_x$ existing in the atmosphere within the third internal cavity 61.

In the measurement pump cell 41, oxygen produced as a result of decomposition of the nitrogen oxide in the atmosphere surrounding the measurement electrode 44 is pumped out, and the amount of oxygen produced can be detected as a pump current Ip2.

Furthermore, in order to detect the oxygen partial pressure around the measurement electrode 44, the first solid electrolyte layer 4, the third substrate layer 3, the measurement electrode 44, and the reference electrode 42 constitute an electrochemical sensor cell, that is, a measurement-pump-control oxygen-partial-pressure detection sensor cell 82. A variable power source 46 is controlled based on an electromotive force (voltage V2) detected by the measurement-pump-control oxygen-partial-pressure detection sensor cell 82.

The measurement-object gas introduced to the second internal cavity 40 reaches the measurement electrode 44 in the third internal cavity 61 via the fourth diffusion controlling section 60 under a condition where the oxygen partial pressure is controlled. The nitrogen oxide in the measurement-object gas surrounding the measurement electrode 44 is reduced ($2NO \rightarrow N_2+O_2$), so that oxygen is produced. Then, the produced oxygen is to undergo pumping by the measurement pump cell 41. During the pumping of the oxygen, a voltage Vp2 of the variable power source 46 is controlled such that the voltage V2 detected by the measurement-pump-control oxygen-partial-pressure detection sensor cell 82 is a fixed value (i.e., a target value). Because the amount of oxygen produced around the measurement electrode 44 is proportional to the concentration of the nitrogen oxide in the measurement-object gas, the nitrogen oxide concentration in the measurement-object gas is calculated by using the pump current Ip2 in the measurement pump cell 41.

Furthermore, the second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside the sensor can be detected in accordance with an electromotive force (voltage Vref) obtained by the sensor cell 83.

Moreover, the second solid electrolyte layer 6, the spacer layer 5, the first solid electrolyte layer 4, the third substrate layer 3, the outer pump electrode 23, and the reference electrode 42 constitute an electrochemical reference-gas adjustment pump cell 90. The reference-gas adjustment pump cell 90 performs oxygen pumping by receiving a control current (i.e., an oxygen pump current) Ip3 flowing in accordance with a control voltage (voltage Vp3) applied by a power supply circuit 92 connected between the outer pump electrode 23 and the reference electrode 42. Accordingly, the reference-gas adjustment pump cell 90 pumps in oxygen around the reference electrode 42 from the space (i.e., the sensor element chamber 133 in FIG. 1) surrounding the outer pump electrode 23.

In the gas sensor 100 having the above configuration, the measurement pump cell 41 receives the measurement-object gas whose oxygen partial pressure is constantly maintained at a fixed low value (i.e., a value that substantially has no effect on $NO_x$ measurement) as a result of actuation of the main pump cell 21 and the auxiliary pump cell 50. Thus, the $NO_x$ concentration in the measurement-object gas can be ascertained based on the pump current Ip2 flowing as a result of oxygen produced by $NO_x$ reduction being pumped out by the measurement pump cell 41 substantially in proportion to the $NO_x$ concentration in the measurement-object gas.

Furthermore, in order to enhance oxygen ion conductivity of the solid electrolyte, the sensor element 101 includes a heater unit 70 having a role of temperature adjustment for keeping the sensor element 101 warm by heating the sensor element 101. The heater unit 70 includes a heater connector electrode 71, a heater 72, a through-hole 73, a heater insulation layer 74, a pressure release hole 75, and a lead wire 76.

The heater connector electrode 71 is provided in contact with the lower surface of the first substrate layer 1. By being connected to an external power source, the heater connector electrode 71 can supply electricity to the heater unit 70 from the outside.

The heater 72 is an electrical resistor interposed between the second substrate layer 2 and the third substrate layer 3 from above and below. The heater 72 is connected to the heater connector electrode 71 via the lead wire 76 and the through-hole 73, and generates heat by being supplied with electricity from the outside via the heater connector electrode 71, thereby heating and maintaining the temperature of the solid electrolyte constituting the sensor element 101.

Furthermore, the heater 72 is embedded in the entire region from the first internal cavity 20 to the third internal cavity 61, and is capable of adjusting the entire sensor element 101 to a temperature at which the aforementioned solid electrolyte is activated.

The heater insulation layer 74 is a porous-alumina insulation layer provided on the upper and lower surfaces of the heater 72 and formed of an insulator composed of, for example, alumina. The heater insulation layer 74 is provided for the purpose of obtaining electrical insulation between the second substrate layer 2 and the heater 72, as well as electrical insulation between the third substrate layer 3 and the heater 72.

The pressure release hole 75 extends through the third substrate layer 3 and the reference-gas introduction layer 48 and is provided for the purpose of alleviating an increase in internal pressure occurring due to a temperature increase in the heater insulation layer 74.

As shown in FIG. 3, the control device 95 includes the aforementioned variable power sources 24, 46, and 52, a heater power source 78, the aforementioned power supply circuit 92, and a controller 96. The controller 96 is a microprocessor including a CPU 97, a RAM (not shown), and a storage unit 98. The storage unit 98 is a nonvolatile memory, such as a ROM, and stores various types of data. The controller 96 receives the voltages V0 to V2 and the voltage Vref from the sensor cells 80 to 83. The controller 96 receives the pump currents Ip0 to Ip2 and the pump current Ip3 flowing through the pump cells 21, 50, 41, and 90. The controller 96 outputs control signals to the variable power sources 24, 46, and 52 and the power supply circuit 92 so as to control the voltages Vp0 to Vp3 output by the variable power sources 24, 46, and 52 and the power supply circuit 92, thereby controlling the pump cells 21, 41, 50, and 90. The controller 96 outputs a control signal to the heater power source 78 so as to control the electric power supplied to the heater 72 by the heater power source 78, thereby adjusting the temperature of the sensor element 101. The storage unit 98 stores therein, for example, target values V0*, V1*, V2*, Ip1* to be described below.

The controller 96 performs feedback control on the pump voltage Vp0 of the variable power source 24 so as to set the voltage V0 to the target value V0* (i.e., to set the oxygen concentration in the first internal cavity 20 to a target concentration).

The controller 96 performs feedback control on the voltage Vp1 of the variable power source 52 so as to set the voltage V1 to a fixed value (referred to as "target value V1*") (i.e., to set the oxygen concentration in the second internal cavity 40 to a predetermined low oxygen concentration that substantially has no effect on $NO_x$ measurement). In addition, the controller 96 sets (i.e., performs feedback control on) the target value V0* of the voltage V0 based on the pump current Ip1 so as to set the pump current Ip1 flowing in accordance with the voltage Vp1 to a fixed value (referred to as "target value Ip1*"). Accordingly, the gradient of the oxygen partial pressure in the measurement-object gas introduced to the second internal cavity 40 from the third diffusion controlling section 30 is constantly fixed. Moreover, the oxygen partial pressure in the atmosphere within the second internal cavity 40 is controlled to a low partial pressure that substantially has no effect on $NO_x$ measurement. The target value V0* is set to a value at which the oxygen concentration in the first internal cavity 20 is higher than 0% and is a low oxygen concentration.

The controller 96 performs feedback control on the voltage Vp2 of the variable power source 46 so as to set the voltage V2 to a fixed value (referred to as "target value V2*") (i.e., to set the oxygen concentration in the third internal cavity 61 to a predetermined low concentration). Thus, oxygen produced as a result of a specific gas (in this case, $NO_x$) in the measurement-object gas being reduced in the third internal cavity 61 is pumped out from the third internal cavity 61 such that the oxygen becomes substantially zero. Then, the controller 96 acquires the pump current Ip2 as a detection value according to the oxygen produced in the third internal cavity 61 from $NO_x$, and calculates the $NO_x$ concentration in the measurement-object gas based on the pump current Ip2. The target value V2* is preliminarily set as a value at which the pump current Ip2 flowing in accordance with the feedback-controlled voltage Vp2 serves as a limiting current. The storage unit 98 stores therein, for example, a relational expression (e.g., a linear function expression) or a map as a correspondence relationship between the pump current Ip2 and the $NO_x$ concentration. Such a relational expression or a map can be preliminarily obtained from tests. Then, the controller 96 detects the $NO_x$ concentration in the measurement-object gas based on the acquired pump current Ip2 and the aforementioned correspondence relationship stored in the storage unit 98.

The controller 96 controls the power supply circuit 92 to apply the control voltage Vp3 to the reference-gas adjustment pump cell 90, thereby causing the pump current Ip3 to flow. In this embodiment, the control voltage Vp3 is set to a direct-current voltage at which the pump current Ip3 is a predetermined value (i.e., a fixed direct-current value). Therefore, by causing the pump current Ip3 to flow, the reference-gas adjustment pump cell 90 pumps in a specific amount of oxygen from the periphery of the outer pump electrode 23 to the periphery of the reference electrode 42.

The control device 95, including the variable power sources 24, 46, and 52 and the power supply circuit 92 shown in FIG. 2, is actually connected to the electrodes in the sensor element 101 via lead wires (not shown) provided in the sensor element 101 (only a reference electrode lead 47 to be described later is shown in FIG. 4), the connector 150, and the lead wires 155 shown in FIG. 1.

The reference-gas introduction section 49 and the surrounding configuration thereof will be described in detail with reference to FIG. 4. As mentioned above, FIG. 4 is a cross-sectional view taken along line A-A in FIG. 2. In FIG. 4, a region where the reference-gas introduction space 43 exists when the sensor element 101 is viewed from above, that is, a region where the reference-gas introduction space 43 is projected onto the cross section taken along line A-A in FIG. 2, is indicated with a single-dot chain line. The reference-gas introduction layer 48 extends inward (in this case, forward) in the longitudinal direction (in this case, the front-rear direction) of the sensor element 101 from near the rear end of the sensor element 101 to a position beyond the reference electrode 42. The reference-gas introduction layer 48 includes a front segment **48*a* and a rear segment 48*b*. The front segment 48*a* covers the reference electrode 42, and the pressure release hole 75 also extends vertically through this front segment 48*a*. The reference-gas introduction layer 48 may have a width (in this case, a length in the left-right direction) that increases in a stepwise manner from the rear side toward the front side of the sensor element 101. In detail, the front segment 48*a* and the rear segment 48*b* are both rectangular in plan view, that is, when viewed from above, and the width of the rectangle of the rear segment 48*b* is smaller than the width of the rectangle of the front segment 48*a*. As mentioned above, the upper surface of the reference-gas introduction layer 48 is partially exposed to the reference-gas introduction space 43. In detail, an overlapping section between the reference-gas introduction layer 48 and the reference-gas introduction space 43 (i.e., the rectangular region indicated with the single-dot chain line) shown in FIG. 4 is the part of the reference-gas introduction layer 48 that is exposed to the reference-gas introduction space 43. In this embodiment, a part of the upper surface of the front segment 48*a* and the entire upper surface of the rear segment 48*b* are exposed to the reference-gas introduction space 43. As shown in FIG. 4, the pressure release hole 75 is open to the reference-gas introduction space 43. As shown in FIGS. 2 and 4, the rear end of the reference-gas introduction layer 48 is located inward (in this case, forward) of the rear end surface of the sensor element 101**.

The reference gas introduced into the reference-gas introduction space 43 from the entrance **49*a* travels through a particular segment of the reference-gas introduction layer 48 located between the reference-gas introduction space 43 and the reference electrode 42, so as to reach the reference electrode 42. Such a segment serving as a reference-gas path in the reference-gas introduction layer 48 and located between the reference-gas introduction space 43 and the reference electrode 42 will be referred to as a path segment 84. As shown in FIG. 4, the path segment 84 is a segment of the reference-gas introduction layer 48 extending from an end (in this case, the front end) of the reference-gas introduction space 43 closest to the reference electrode 42 to an end (in this case, the rear end) of the reference electrode 42 closest to the reference-gas introduction space 43. In this embodiment, a part of the front segment 48*a* serves as the path segment 84**.

The path segment 84 includes a first porous region 85 and a second porous region 86 having a low porosity region **86*a*. The second porous region 86 is disposed closer to the reference electrode 42 (in this case, forward of the first porous region 85) relative to the first porous region 85. A porosity P2 [%] of the low porosity region 86*a* of the second porous region 86 is lower than a porosity P1 [%] of the first porous region 85. The first porous region 85 and the second porous region 86 are disposed in contact with each other in the front-rear direction. The second porous region 86 and the reference electrode 42 are disposed in contact with each other in the front-rear direction. The first porous region 85 and the second porous region 86 both are rectangular in plan view, that is, when viewed from above. A width W1 of the first porous region 85 and a width W2 of the low porosity region 86*a* of the second porous region 86 are the same, and each of these widths W1 and W2 is larger than a width Wr of the reference electrode 42. In this embodiment, the path segment 84 is constituted only of the first porous region 85 and the second porous region 86. Furthermore, in this embodiment, the entire second porous region 86 is the low porosity region 86*a*. Therefore, the porosity and the width of the second porous region 86 are respectively equal to the porosity P2 and the width W2 of the low porosity region 86*a*. Moreover, the length of the second porous region 86 in the front-rear direction is equal to a length L2 of the low porosity region 86*a* in the front-rear direction. A diffusion resistance [$mm^{-2}$] (referred to as "diffusion resistance Rp2" hereinafter) per unit length of the second porous region 86 is higher than a diffusion resistance [$mm^{-2}$] (referred to as "diffusion resistance Rp1" hereinafter) per unit length of the first porous region 85. The diffusion resistance Rp2 is higher than a diffusion resistance [$mm^{-2}$] (referred to as "diffusion resistance Rp0" hereinafter) per unit length of the reference-gas introduction space 43. A diffusion resistance R2 [$mm^{-1}$] of the second porous region 86 can be calculated by dividing the length L2 [mm] of the second porous region 86 in the front-rear direction by a cross-sectional area [$mm^2$] of the second porous region 86 taken along a plane perpendicular to the front-rear direction. The cross-sectional area of the second porous region 86 can be calculated as a product of the width W2 [mm] of the second porous region 86, a thickness T2 [mm], and a porosity P2/100. Specifically, the diffusion resistance R2 can be calculated as $R2=L2/(W2\times T2\times P2/100)$. The diffusion resistance Rp2 can be calculated as $Rp2=R2/L2=1/(W2\times T2\times P2/100)$. A diffusion resistance R1 and the diffusion resistance Rp1 of the first porous region 85 and a diffusion resistance R0 and the diffusion resistance Rp0 of the reference-gas introduction space 43 can be calculated in a similar manner. A porosity P0 of the reference-gas introduction space 43** is 100%. The porosity P1 may be 25% or higher. The porosity P1 may be 80% or lower, or may be 55% or lower. The porosity P2 may be between 1% and 10% inclusive. The diffusion resistance Rp0 per unit length may be between 5 $mm^{-2}$ and 12 $mm^{-2}$ inclusive. The diffusion resistance Rp1 per unit length may be 15 $mm^{-2}$ or higher, or may be 30 $mm^{-2}$ or higher. The diffusion resistance Rp1 per unit length may be 40 $mm^{-2}$ or lower. The diffusion resistance Rp2 may be 140 $mm^{-2}$ or higher, or may be 190 $mm^{-2}$ or higher. The diffusion resistance Rp2 may be 1500 $mm^{-2}$ or lower, or may be 700 $mm^{-2}$ or lower.

The porosity P1 of the first porous region 85 is a value derived as follows by using an image (SEM image) obtained from observation using a scanning electron microscope (SEM). First, the sensor element 101 is cut such that a cross section of the first porous region 85 is set as an observation surface, and an observation sample is obtained by performing resin-embedding and polishing on the cut surface. Then, the observation surface of the observation sample is photographed by SEM photography (with a secondary electron image, an acceleration voltage of 15 kV, and a magnifying power of 1000, but a magnifying power higher than 1000 and lower than or equal to 5000 if the magnifying power of 1000 is inappropriate), whereby an SEM image of the first porous region 85 is obtained. Subsequently, the obtained image is analyzed, so that a threshold value is determined using the discriminant analysis method (Otsu binarization method) from a brightness distribution of brightness data of the pixels in the image. Then, each pixel in the image is binarized into an object section and a pore section based on the determined threshold value, and the area of the object section and the area of the pore section are calculated. Then, the percentage of the area of the pore section relative to the overall area (i.e., the total area of the object section and the pore section) is derived as the porosity P1. For the porosity P2 of the low porosity region 86*a*, a value calculated in a similar manner is obtained.

In this embodiment, segments other than the path segment 84 in the reference-gas introduction layer 48 are all composed of the same material as the first porous region 85 and have the same porosity and thickness as the first porous region 85. Specifically, a segment of the reference-gas introduction layer 48 located forward of the path segment 84 and covering the reference electrode 42 and a segment of the reference-gas introduction layer 48 located rearward of the path segment 84 are composed of the same material as the first porous region 85 and have the same porosity and thickness as the first porous region 85. Furthermore, in this embodiment, the first porous region 85 and the second porous region 86 are composed of the same material, and a thickness T1 of the first porous region 85 and the thickness T2 of the second porous region 86 are the same. Alternatively, these regions may be composed of different materials, or may have different thicknesses. Moreover, the porosity of the segments other than the path segment 84 in the reference-gas introduction layer 48 may be different from the porosity of the first porous region 85.

The reference electrode 42 is electrically connected to the reference electrode lead 47. The reference electrode lead 47 extends leftward from the right side surface of the sensor element 101 to extend into the porous reference-gas introduction layer 48, bends forward therefrom to extend in the longitudinal direction of the reference-gas introduction layer 48, and then reaches the reference electrode 42. In mid-course, the reference electrode lead 47 is wired to bypass the pressure release hole 75. This reference electrode lead 47 is connected to a connector electrode (not shown) disposed at the upper surface or the lower surface of the sensor element 101. By using the reference electrode lead 47 and the connector electrode, electricity can be supplied to the reference electrode 42 from the outside, or the voltage and the current of the reference electrode 42 can be externally measured. The reference-gas introduction layer 48 may also function as an insulation layer that insulates the reference electrode lead 47 from the third substrate layer 3 and the first solid electrolyte layer 4.

Next, an example of a method for manufacturing the gas sensor 100 will be described below. First, six non-calcinated ceramic green sheets each containing an oxygen-ion-conductive solid electrolyte, such as zirconia, as a ceramic component are prepared. In each of these green sheets, a plurality of sheet holes used for positioning during printing or stacking as well as necessary through-holes are formed in advance. Furthermore, the green sheet that is to become the spacer layer 5 preliminarily undergoes a punching process so as to be provided with a space that is to become the measurement-object gas flow section. The green sheet that is to become the first solid electrolyte layer 4 preliminarily undergoes a punching process so as to be provided with a space that is to become the reference-gas introduction space 43. Then, a pattern-printing process and a drying process for forming various patterns in the ceramic green sheets are performed in correspondence with the first substrate layer 1, the second substrate layer 2, the third substrate layer 3, the first solid electrolyte layer 4, the spacer layer 5, and the second solid electrolyte layer 6. In detail, the patterns to be formed are patterns of, for example, the aforementioned electrodes, the lead wires to be connected to the electrodes, the reference-gas introduction layer 48, and the heater unit 70. The pattern-printing process is performed by applying a pattern-forming paste prepared in accordance with the properties required in an object to be formed onto a green sheet by using a known screen printing technique. A known drying technique is also used for the drying process. When the pattern printing process and the drying process are completed, an adhesive paste for stacking and adhering together the green sheets corresponding to the respective layers is printed and dried. Then, the green sheets provided with the adhesive paste are stacked in a predetermined order while being positioned using the sheet holes, and then undergo a pressure bonding process by receiving a predetermined temperature and a predetermined pressure, thereby becoming a single layered body. The layered body obtained in this manner contains a plurality of sensor elements 101 therein. The layered body is cut so as to be divided into sensor elements 101 of a given size. Then, each divided piece of the layered body is calcinated at a predetermined calcination temperature so that a sensor element 101 is obtained. When the plurality of green sheets are to be stacked, the spaces that are to become the measurement-object gas flow section and the reference-gas introduction space 43 are preferably filled with a paste composed of a disappearing material (e.g., theobromine) that disappears during the calcination process.

When the sensor element 101 is obtained in this manner, the sensor assembly 140 (see FIG. 1) having the sensor element 101 integrated therein is fabricated, and the protection cover 130 and the rubber stopper 157 are attached thereto. Then, the control device 95 and the sensor element 101 are connected by the lead wires 155, so that the gas sensor 100 is obtained.

The diffusion resistances R1 and Rp1 of the first porous region 85 and the diffusion resistances R2 and Rp2 of the second porous region 86 can be adjusted by adjusting the shapes of the first porous region 85 and the second porous region 86 or by adjusting the porosities P1 and P2. For example, the porosities P1 and P2 of the first porous region 85 and the second porous region 86 can be adjusted by adjusting the particle diameter of the ceramic particles contained in the pattern-forming paste of the porous bodies in the first porous region 85 and the second porous region 86 or by adjusting the particle diameter or the mixture ratio of a pore-forming material. The diffusion resistances R0 and Rp0 of the reference-gas introduction space 43 can be adjusted by, for example, adjusting the shape of a space that is to become the reference-gas introduction space 43, which is formed by performing a punching process on the green sheet that is to become the first solid electrolyte layer 4.

A process performed by the controller 96 when the gas sensor 100 detects the $NO_x$ concentration in the measurement-object gas will now be described. First, the CPU 97 of the controller 96 starts to drive the sensor element 101. In detail, the CPU 97 transmits a control signal to the heater power source 78 so as to heat the sensor element 101 by using the heater 72. Then, the CPU 97 heats the sensor element 101 to a predetermined driving temperature (e.g., 800° C.). Subsequently, the CPU 97 starts to control the aforementioned pump cells 21, 41, 50, and 90 and to acquire the voltages V0, V1, V2, and Vref from the aforementioned sensor cells 80 to 83. When the measurement-object gas is introduced through the gas inlet 10 in this state, the measurement-object gas travels through the first diffusion controlling section 11, the buffer space 12, and the second diffusion controlling section 13 so as to reach the first internal cavity 20. Then, the oxygen concentration of the measurement-object gas in the first internal cavity 20 and the second internal cavity 40 is adjusted by the main pump cell 21 and the auxiliary pump cell 50, and the measurement-object gas having undergone the adjustment reaches the third internal cavity 61. Subsequently, the CPU 97 detects the $NO_x$ concentration in the measurement-object gas based on the acquired pump current Ip2 and the correspondence relationship stored in the storage unit 98.

In the sensor element 101, the measurement-object gas flow section, such as the gas inlet 10, receives the measurement-object gas from the sensor element chamber 133 shown in FIG. 1. On the other hand, the reference-gas introduction section 49 in the sensor element 101 receives the reference gas (atmospheric gas) in the space 149 shown in FIG. 1. The sensor element chamber 133 and the space 149 are defined by the sensor assembly 140 (i.e., the green compacts 145*a* and 145*b*), and are sealed so that the gas does not flow therebetween. However, for example, in a case where the pressure of the measurement-object gas is high, the measurement-object gas may slightly enter the space 149. Because the measurement-object gas may contain a contaminant, such as an unburned component of an internal combustion engine, the contaminant may enter the reference-gas introduction section 49 when the measurement-object gas enters the space 149. Normally, the entry of this contaminant may cause the oxygen concentration around the reference electrode 42 to decrease, thus causing the reference potential serving as the potential of the reference electrode 42 to change. For example, when hydrocarbon gas as an unburned component enters the reference-gas introduction section 49, the hydrocarbon gas undergoes a combustion reaction with the oxygen surrounding the reference electrode 42, so that the oxygen concentration of the reference gas decreases, thus causing the reference potential to change. This may cause a change in, for example, a voltage based on the reference electrode 42, such as the voltage V2 of the measurement-pump-control oxygen-partial-pressure detection sensor cell 82 during the driving of the sensor element 101, thus resulting in deterioration of the detection accuracy for the $NO_x$ concentration in the measurement-object gas. In contrast, in the sensor element 101 according to this embodiment, the path segment 84 of the reference-gas introduction layer 48 has the second porous region 86 with the low porosity (i.e., the low porosity region 86*a*). Accordingly, even if the contaminant enters the reference-gas introduction section 49 from outside the sensor element 101, the contaminant is less likely to travel through the second porous region 86 so that the contaminant may be prevented from reaching the reference electrode 42, whereby the oxygen concentration around the reference electrode 42 is less likely to decrease. Therefore, the sensor element 101 according to this embodiment has high resistance to contaminants, so that a change in the reference potential caused by the contaminant is suppressed, and deterioration of the detection accuracy for the $NO_x$ concentration in the measurement-object gas is also suppressed.

During a non-driving period of the sensor element 101, the reference-gas introduction layer 48 may sometimes adsorb water from outside the sensor element 101, that is, from inside the space 149. The water in the space 149 may originally exist slightly in the space 149 or may enter the space 149 from a gap between the rubber stopper 157 and the outer cylinder 148. When the controller 96 starts to drive the sensor element 101, the sensor element 101 is heated by the heater 72 so that water in the reference-gas introduction layer 48 becomes gas and is released outward (in this case, to the space 149) from the reference-gas introduction layer 48. However, until the water is released, the water in the gaseous state exists, sometimes causing the oxygen concentration around the reference electrode 42 to decrease. Thus, a time period (referred to as "stabilization period" hereinafter) from when the driving of the sensor element is started to when the potential of the reference electrode 42 becomes stable changes in accordance with the time required for releasing the water from the reference-gas introduction layer 48. In this regard, in the sensor element 101 according to this embodiment, the path segment 84 of the reference-gas introduction layer 48 has the first porous region 85 having a higher porosity at the entrance side of the reference-gas introduction section 49 relative to the second porous region 86 having the low porosity region 86*a*. Accordingly, the water adsorbed into the reference-gas introduction layer 48 when the sensor element 101 is not driven is readily diffused outward from the sensor element 101 when the sensor element 101 is driven. Therefore, the stabilization period of the sensor element 101 can be shortened.

In contrast, for example, in a case where the second porous region 86 having the low porosity region 86*a* is not provided and the entire reference-gas introduction layer 48 has the same porosity as the first porous region 85, the stabilization period can be shortened, but the resistance to contaminants deteriorates. Furthermore, for example, in a case where the entire reference-gas introduction layer 48 has the same porosity as the low porosity region 86*a*, the resistance to contaminants becomes higher, but the stabilization period becomes longer. In a case where the front-rear positional relationship between the first porous region 85 and the second porous region 86 is inverted in the path segment 84, the resistance to contaminants becomes higher owing to the low porosity region 86*a*, but the stabilization period becomes longer since the water in the first porous region 85 is less likely to be released. Unlike these cases, the sensor element 101 according to this embodiment includes the second porous region 86 having the low porosity region 86*a* with the low porosity, and also includes the first porous region 85 with a higher porosity at the entrance side of the reference-gas introduction section 49 than the second porous region 86, thereby both achieving a shorter stabilization period and higher resistance to contaminants.

The diffusion resistance per unit length of the reference-gas introduction space 43 is lower than that of the reference-gas introduction layer 48. Therefore, the reference gas is less likely to flow through a segment of the reference-gas introduction layer 48 located rearward of the path segment 84, that is, a segment of the reference-gas introduction layer 48 located rearward of the front end of the reference-gas introduction space 43. Therefore, the diffusion resistance of this segment hardly affects the stabilization period and the resistance to contaminants.

In this embodiment, during the driving of the sensor element 101, the controller 96 uses the reference-gas adjustment pump cell 90 to pump in oxygen from the periphery of the outer pump electrode 23 to the periphery of the reference electrode 42, as mentioned above. Accordingly, when the oxygen concentration around the reference electrode 42 decreases, the reduced oxygen can be compensated for, thereby suppressing deterioration of the detection accuracy for the $NO_x$ concentration. However, depending on the degree of a decrease in the oxygen concentration of the reference gas surrounding the sensor element 101, even if oxygen is pumped in toward the periphery of the reference electrode 42 by the reference-gas adjustment pump cell 90, the oxygen concentration around the reference electrode 42 may sometimes decrease when a contaminant enters the reference-gas introduction section 49. Therefore, regardless of whether or not oxygen is pumped in by the reference-gas adjustment pump cell 90, the second porous region 86 is provided so that the resistance to contaminants can be enhanced.

The correspondence relationship between the components in this embodiment and the components in the present invention will now be clarified. The first substrate layer 1, the second substrate layer 2, the third substrate layer 3, the first solid electrolyte layer 4, the spacer layer 5, and the second solid electrolyte layer 6 according to this embodiment correspond to an element body according to the present invention, the measurement electrode 44 corresponds to a measurement electrode, the reference electrode 42 corresponds to a reference electrode, the reference-gas introduction space 43 corresponds to a reference-gas introduction space, the reference-gas introduction layer 48 corresponds to a reference-gas introduction layer, the reference-gas introduction section 49 corresponds to a reference-gas introduction section, the heater 72 corresponds to a heater, the first porous region 85 corresponds to a first porous region, the low porosity region **86*a* corresponds to a low porosity region, and the second porous region 86** corresponds to a second porous region.

In the gas sensor 100 according to this embodiment described above in detail, the reference-gas introduction layer 48 has the first porous region 85 and the second porous region 86 within the reference-gas path, that is, the path segment 84, between the reference-gas introduction space 43 and the reference electrode 42. The second porous region 86 has the low porosity region **86*a* with a lower porosity than the first porous region 85 and is disposed closer to the reference electrode 42 relative to the first porous region 85. Accordingly, the stabilization period of the sensor element 101 is shortened, and the sensor element 101** has higher resistance to contaminants.

In the gas sensor 100 according to this embodiment, a ratio Rp2/Rp1 between the diffusion resistance Rp1 per unit length of the first porous region 85 and the diffusion resistance Rp2 per unit length of the second porous region 86 may be between 5 and 50 inclusive. When the ratio Rp2/Rp1 is 5 or higher, the diffusion resistance Rp2 is not too low, so that the sensor element 101 has further enhanced resistance to contaminants. When the ratio Rp2/Rp1 is 50 or lower, the diffusion resistance Rp2 is not too high, so that the stabilization period of the sensor element 101 is further shortened. The ratio Rp2/Rp1 may be 10 or higher. The ratio Rp2/Rp1 may be 20 or lower.

Furthermore, in the gas sensor 100 according to this embodiment, a ratio Rp1/Rp0 between the diffusion resistance Rp0 per unit length of the reference-gas introduction space 43 and the diffusion resistance Rp1 per unit length of the first porous region 85 may be between 2 and 10 inclusive. When the ratio Rp1/Rp0 is 2 or higher, the diffusion resistance Rp1 is not too low, so that the sensor element 101 has further enhanced resistance to contaminants. When the ratio Rp1/Rp0 is 10 or lower, the diffusion resistance Rp1 is not too high, so that the stabilization period of the sensor element 101 is further shortened. The ratio Rp1/Rp0 may be 3 or higher. The ratio Rp1/Rp0 may be 5 or lower, or may be 4 or lower.

Moreover, in the gas sensor 100 according to this embodiment, the diffusion resistance Ra of the reference-gas introduction section 49 may be 1200 $mm^{-1}$ or lower. Accordingly, because the diffusion resistance of the entire reference-gas introduction section 49 is not too high, the stabilization period of the sensor element 101 is further shortened. The diffusion resistance Ra of the reference-gas introduction section 49 can be expressed by the sum of the diffusion resistance R0 of the reference-gas introduction space 43 and the diffusion resistance of the path segment 84 in the reference-gas introduction section 49. In this embodiment, the diffusion resistance of the path segment 84 can be expressed by the sum of the diffusion resistance R1 of the first porous region 85 and the diffusion resistance R2 of the second porous region 86. Therefore, in this embodiment, the diffusion resistance Ra can be calculated as Ra=R0+R1+R2. The diffusion resistance Ra may be 1000 $mm^{-1}$ or lower. The diffusion resistance Ra may be 500 $mm^{-1}$ or higher.

In the gas sensor 100 according to this embodiment, the width W2 of the low porosity region **86*a* may be 90% or more of the width W1 of the first porous region 85, and may be 90% or more of the width Wr of the reference electrode 42. Accordingly, the effect for enhancing the resistance of the sensor element 101 to contaminants by the low porosity region 86*a* can be achieved more reliably. In the sensor element 101 according to this embodiment shown in FIG. 4, the width W2 is equal to the width W1, as mentioned above, so that the width W2 is 90% or more of the width W1. Since the width Wr of the reference electrode 42** is smaller than the widths W1 and W2, the width W2 is 90% or more of the width Wr.

Furthermore, in the gas sensor 100 according to this embodiment, in plan view, an area S2 of the low porosity region **86*a* may be 45% or more of an area Sw of the segment, that is, the path segment 84, between the reference-gas introduction space 43 and the reference electrode 42 in the reference-gas introduction layer 48. Specifically, an area ratio S2/Sw may be 0.45 or higher. Accordingly, the effect for enhancing the resistance of the sensor element 101 to contaminants by the low porosity region 86*a* can be achieved more reliably. In the sensor element 101 according to this embodiment shown in FIG. 4, the width W1 and the width W2 are equal to each other, as mentioned above, so that if the length L2 of the low porosity region 86*a* is 45% or more of a length Lw of the path segment 84 (in this case, the sum of a length L1 of the first porous region 85 and the length L2 of the second porous region 86**), the area S2 is 45% or more of the area Sw. The area S2 may be 50% or more of the area Sw. The area S2 may be 98% or less of the area Sw, or may be 56% or less thereof.

The present invention is not limited whatsoever to the above embodiment, and various embodiments are possible so long as they belong within the technical scope of the present invention.

Figure 5:
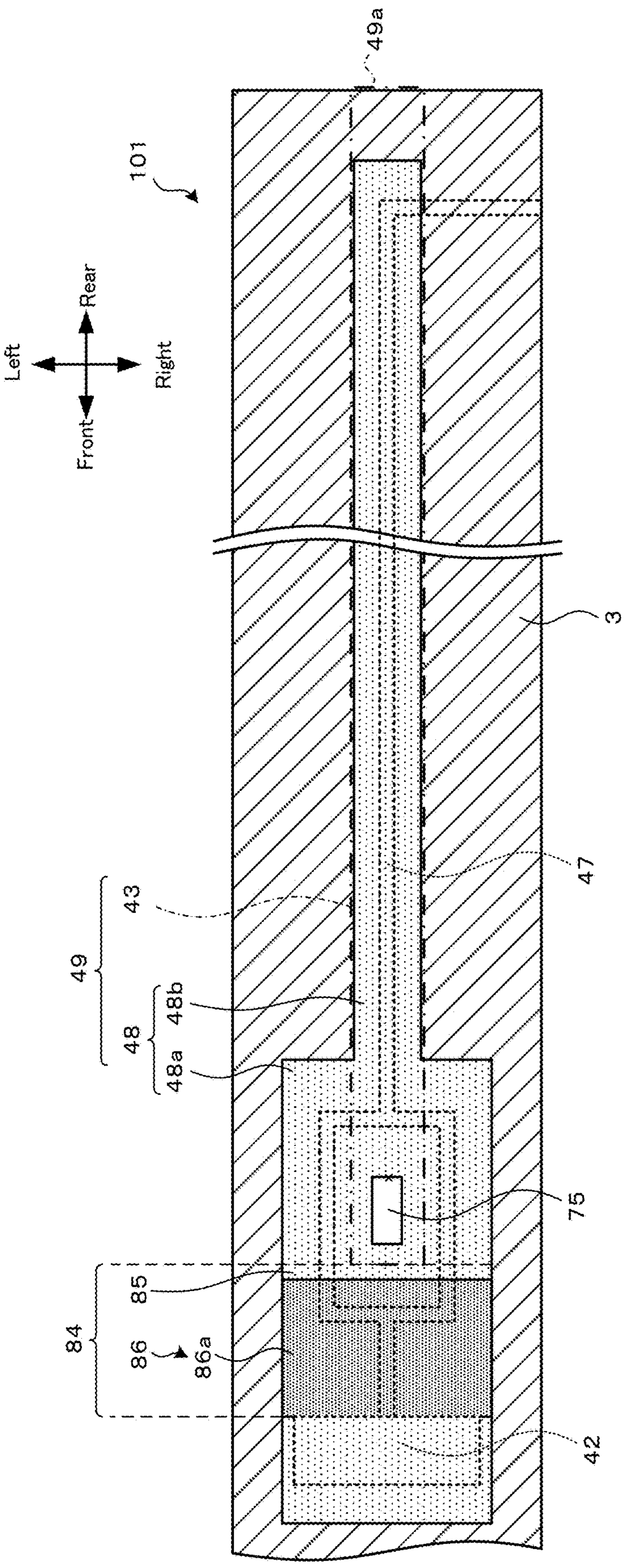
FIG. 5 is a cross-sectional view illustrating a reference-gas introduction layer 48 according to a modification.

For example, the length L2 of the second porous region 86 and the low porosity region 86*a* according to the embodiment described above may be larger than that in the example shown in FIG. 4. For example, as shown in FIG. 5, a large portion of the path segment 84 may be occupied by the low porosity region 86*a*. Even in this case, as mentioned above, the area S2 of the low porosity region 86*a* may be 98% or less of the area Sw of the path segment 84.

Figure 6:
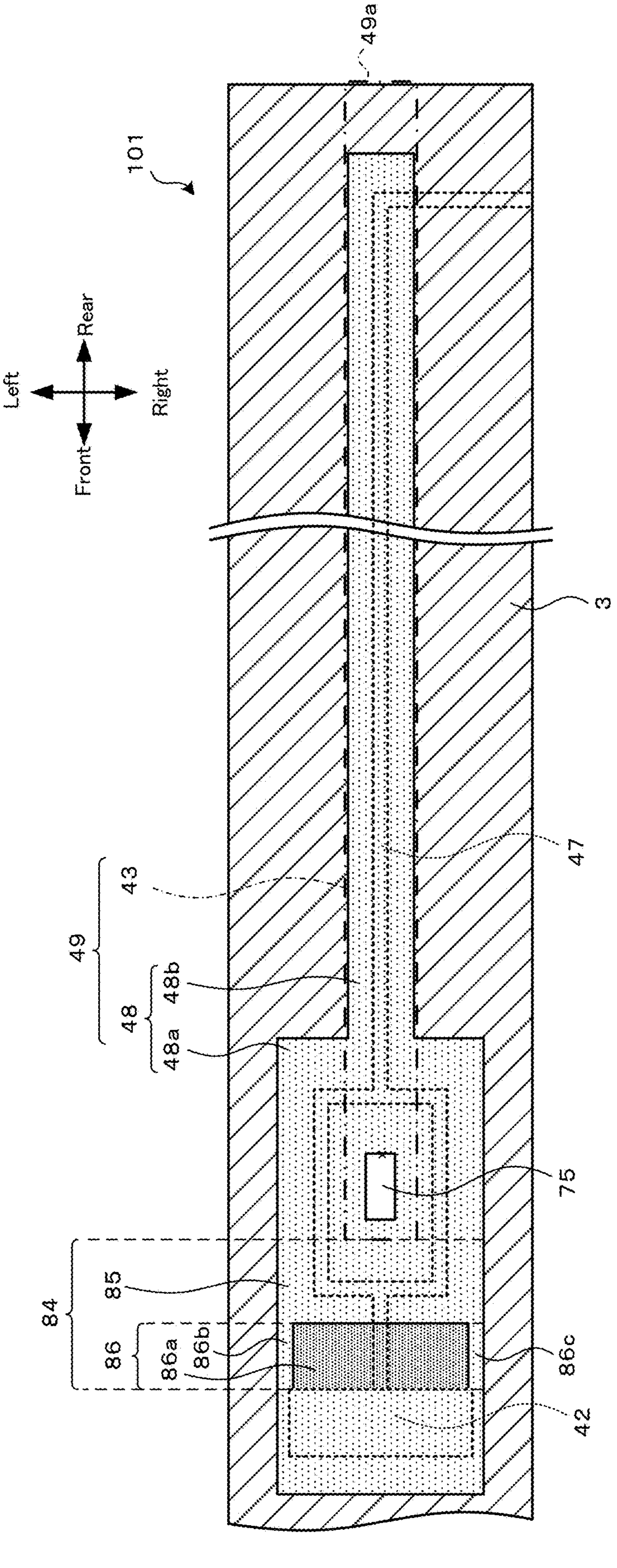
FIG. 6 is a cross-sectional view illustrating a reference-gas introduction layer 48 according to a modification.

In the above embodiment, the entire second porous region 86 is the low porosity region 86*a*, but the configuration is not limited to this. In addition to the low porosity region 86*a*, the second porous region 86 may have a high porosity region with a porosity higher than or equal to the porosity P1 of the first porous region 85, so long as the second porous region 86 has the low porosity region 86*a*. For example, the second porous region 86 in the reference-gas introduction layer 48 according to a modification shown in FIG. 6 has the low porosity region 86*a* and high porosity regions 86*b* and 86*c*. The low porosity region 86*a* in FIG. 6 is similar to the low porosity region 86*a* in FIG. 4 in that the porosity is lower than that of the first porous region 85. The high porosity regions 86*b* and 86*c* are disposed to the left and right of the low porosity region 86*a*. Although the high porosity regions 86*b* and 86*c* may have the same porosity as the first porous region 85 or may have a higher porosity than the first porous region 85, the high porosity regions 86*b* and 86*c* preferably has the same porosity as the first porous region 85. For example, the high porosity regions 86*b* and 86*c* may both be composed of the same material and both have the same porosity as the first porous region 85. In this case, the patterns of the first porous region 85 and the high porosity regions 86*b* and 86*c* may be collectively formed by screen printing during the manufacturing of the sensor element 101. Even if the second porous region 86 has the high porosity regions 86*b* and 86*c*, the second porous region 86 having the low porosity region 86*a* allows the sensor element 101 to have high resistance to contaminants owing to the existence of the low porosity region 86*a*. In FIG. 6, the second porous region 86 does not have to include one of the high porosity region 86*b* and the high porosity region 86*c*.

In the case where the second porous region 86 has the low porosity region 86*a* and the high porosity regions, the diffusion resistance R2 of the second porous region 86 can be calculated as a combined diffusion resistance of the diffusion resistance of the low porosity region 86*a* and the diffusion resistance of the high porosity regions. For example, assuming that the diffusion resistance of the high porosity regions 86*b* and 86*c* is defined as X [$mm^{-1}$] and the diffusion resistance of the low porosity region 86*a* is defined as Y [$mm^{-1}$] in the second porous region 86 in FIG. 6, the diffusion resistance X and the diffusion resistance Y can be regarded as being connected in parallel and can thus be calculated as the diffusion resistance R2=1/(1/X+1/Y). Similar to the calculation method for the diffusion resistances R1 and R2 in the above embodiment, the diffusion resistances X and Y can be calculated as length/(width x thickness x porosity/100) for the respective regions. The diffusion resistance Rp2 per unit length of the second porous region 86 can be calculated as Rp2=R2/L2, similar to the diffusion resistance Rp2 in the above embodiment.

In the case where the second porous region 86 has the high porosity regions in addition to the low porosity region 86*a*, the porosity and the width of the second porous region 86 are values different from those of the porosity P2 and the width W2 of the low porosity region 86*a*. In this case, the width W2 of the low porosity region 86*a* instead of the width of the second porous region 86 is preferably 90% or more of the width W1 and 90% or more of the width Wr. For example, in the second porous region 86 in FIG. 6, the width W2 of the low porosity region 86*a* is smaller than the width W1 of the first porous region 85. In this case, the width W2 is preferably 90% or more of the width W1 and 90% or more of the width Wr.

In the above embodiment, the width W2 of the low porosity region 86*a* is equal to the width W1 of the first porous region 85, but the configuration is not limited to this. For example, the width W2 may be larger than the width W1. When width W1>width Wr as in FIGS. 4 to 6, if the width W2 is 90% or more of the width W1, the width W2 is naturally 90% or more of the width Wr. Although not shown, width Wr≥width W1. In that case, if the width W2 is 90% or more of the width Wr, the width W2 is naturally 90% or more of the width W1.

Figure 7:
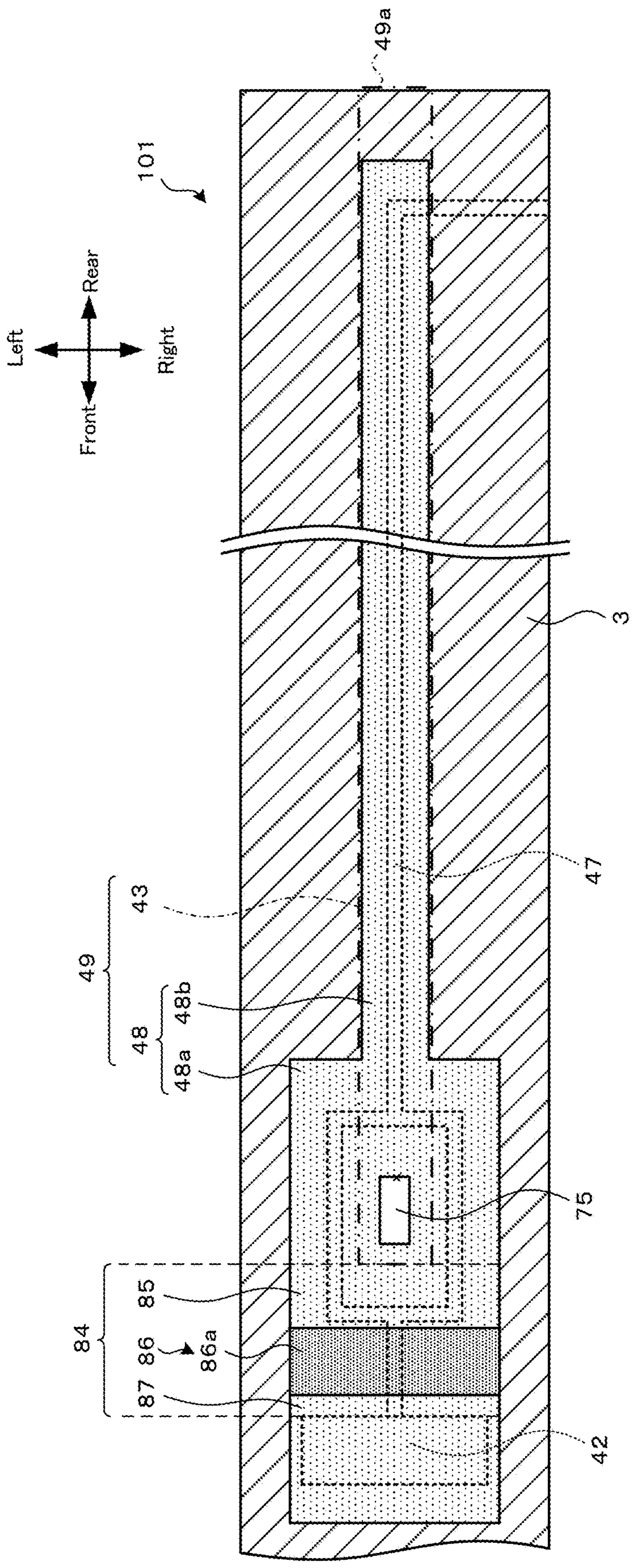
FIG. 7 is a cross-sectional view illustrating a reference-gas introduction layer 48 according to a modification.

In the above embodiment, the path segment 84 is constituted only of the first porous region 85 and the second porous region 86, but the configuration is not limited to this. For example, as shown in FIG. 7, the path segment 84 may include a third porous region 87 in addition to the first porous region 85 and the second porous region 86. The third porous region 87 is disposed between the second porous region 86 and the reference electrode 42, and is in contact with the front end of the second porous region 86 and the rear end of the reference electrode 42. A porosity P3 of the third porous region 87 may be higher than the porosity P2 of the low porosity region 86*a*. The porosity P3 of the third porous region 87 may be the same as the porosity P1 of the first porous region 85. The third porous region 87 may be composed of the same material as the first porous region 85 and may have the same porosity and the same thickness as the first porous region 85. In plan view, an area S3 of the third porous region 87 is preferably 20% or less of the area Sw of the path segment 84. Accordingly, the area S3 of the third porous region 87 located at a position closer to the reference electrode 42 relative to the second porous region 86 is not too large, so that the stabilization period of the sensor element 101 is less likely to be long. Regions located in the left-right direction (i.e., a direction perpendicular to the flowing direction of the reference gas in the path segment 84) relative to the low porosity region 86*a*, like the high porosity regions 86*b* and 86*c* in FIG. 6, are included in the second porous region 86. However, a region located in the front-rear direction (i.e., a direction extending parallel to the flowing direction of the reference gas in the path segment 84) relative to the low porosity region 86*a*, like the third porous region 87 in FIG. 7, is not included in the second porous region 86. In other words, the second porous region 86 is defined such that the front end and the rear end thereof are respectively aligned with the front end and the rear end of the low porosity region 86*a*. Therefore, the length of the second porous region 86 in the front-rear direction is always equal to the length L2 of the low porosity region 86*a* in the front-rear direction.

In the configurations in FIGS. 6 and 7, the area S2 of the low porosity region 86*a* is preferably 45% or more of the area Sw of the path segment 84, similar to the above embodiment.

In the above embodiment, the front segment 48*a* and the rear segment 48*b* of the reference-gas introduction layer 48 are both rectangular in plan view, but the configuration is not particularly limited to this. For example, at least one of the front segment 48*a* and the rear segment 48*b* may have a shape in which the width gradually increases in the front-rear direction. If the width of the first porous region 85 is not fixed, as in a case where the width of the first porous region 85 gradually increases in the front-rear direction, an average value may be set as the width W1. The same applies to the width W2 of the low porosity region 86*a*.

Although the reference electrode lead 47 is bifurcated into two branches in mid-course for bypassing the pressure release hole 75 in the above embodiment, the bypassing and the bifurcation are not necessary if there is no pressure release hole 75.

In the above embodiment, the rear end of the reference-gas introduction layer 48 is located inward relative to the rear end surface of the sensor element 101, but the configuration is not limited thereto. For example, the reference-gas introduction layer 48 may be longer than that in FIG. 4, such that the rear end of the reference-gas introduction layer 48 is flush with the rear end surface of the sensor element 101

Figure 8:
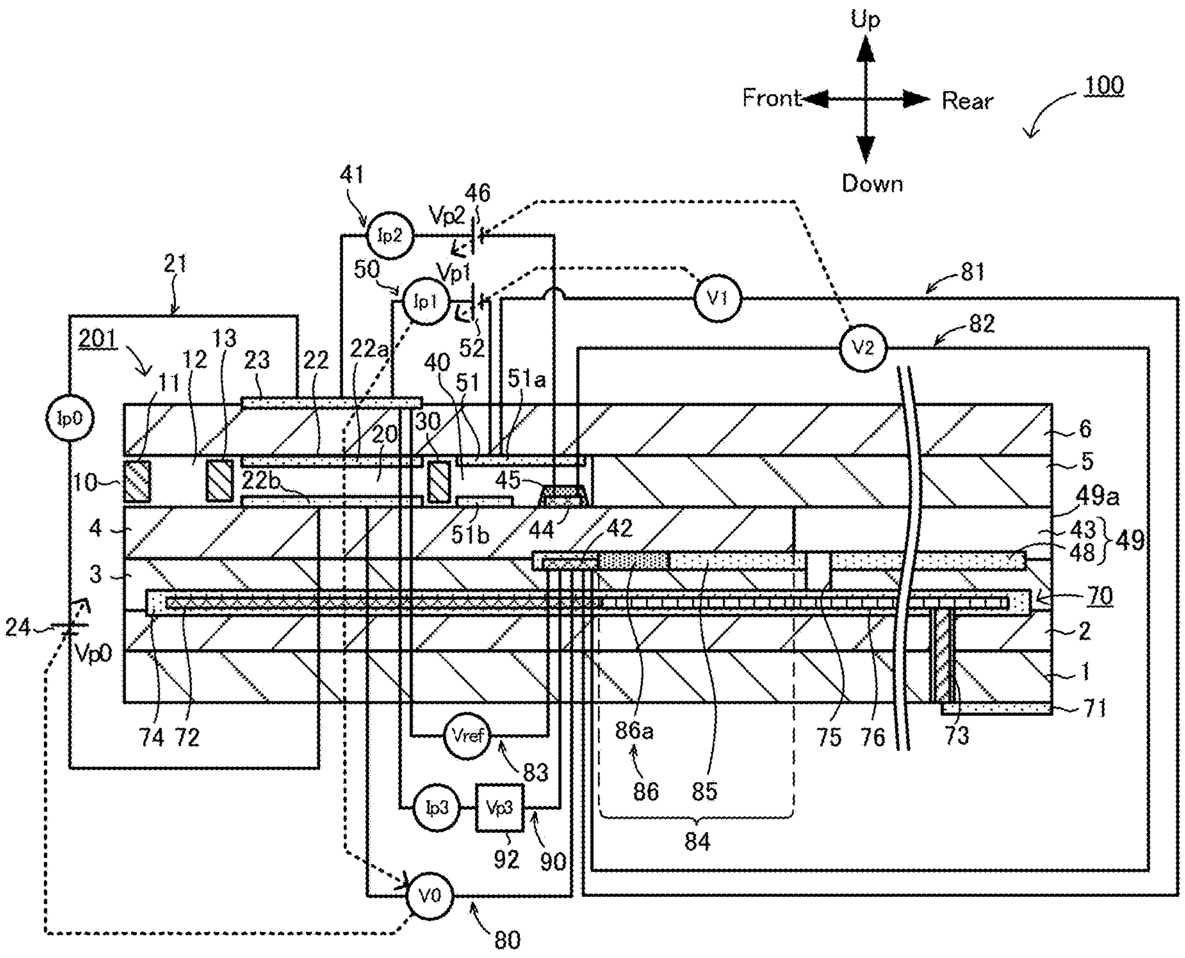
FIG. 8 is a schematic cross-sectional view of a sensor element 201 according to a modification.

In the above embodiment, the sensor element 101 of the gas sensor 100 has the first internal cavity 20, the second internal cavity 40, and the third internal cavity 61, but the configuration is not limited thereto. For example, the third internal cavity 61 does not have to be provided, as in a sensor element 201 according to a modification shown in FIG. 8. In the sensor element 201 according to the modification shown in FIG. 8, the gas inlet 10, the first diffusion controlling section 11, the buffer space 12, the second diffusion controlling section 13, the first internal cavity 20, the third diffusion controlling section 30, and the second internal cavity 40 are provided next to one another between the lower surface of the second solid electrolyte layer 6 and the upper surface of the first solid electrolyte layer 4 in a conductive manner in that order. Furthermore, the measurement electrode 44 is disposed on the upper surface of the first solid electrolyte layer 4 within the second internal cavity 40. The measurement electrode 44 is covered by a fourth diffusion controlling section 45. The fourth diffusion controlling section 45 is a film formed of a ceramic porous body composed of, for example, alumina ($Al_2O_3$). Similar to the fourth diffusion controlling section 60 according to the above embodiment, the fourth diffusion controlling section 45 has a role of limiting the amount of $NO_x$ flowing to the measurement electrode 44. Moreover, the fourth diffusion controlling section 45 also functions as a protective film for the measurement electrode 44. The ceiling electrode 51*a* of the auxiliary pump electrode 51 is provided to extend to a position directly above the measurement electrode 44. The sensor element 201 having such a configuration is similar to that in the above embodiment in that the measurement pump cell 41 can detect the $NO_x$ concentration. In the sensor element 201 in FIG. 8, the periphery of the measurement electrode 44 functions as a measurement chamber. Specifically, the periphery of the measurement electrode 44 has a role similar to that of the third internal cavity 61.

In the above embodiment, the pump current Ip3 is a fixed direct current, but is not limited thereto. For example, the pump current Ip3 may be a pulsed intermittent current. Furthermore, the pump current Ip3 is a fixed direct current that constantly flows in the direction in which oxygen is pumped in toward the periphery of the reference electrode 42 in the above embodiment, but is not limited thereto. For example, there may be a time period in which the pump current Ip3 flows in the direction in which oxygen is pumped out from the periphery of the reference electrode 42. Even in that case, the overall moving direction of the oxygen may be the direction in which the oxygen is pumped in toward the periphery of the reference electrode 42 in view of a sufficiently-long predetermined time period.

In the aforementioned sensor element 101, the circuit of the reference-gas adjustment pump cell 90 may be omitted, or the gas sensor 100 does not have to be equipped with the power supply circuit 92. Furthermore, the gas sensor 100 does not have to be equipped with the control device 95. For example, in place of the control device 95, the gas sensor 100 may include an external connector attached to the lead wires 155 and used for connecting the control device 95 and the lead wires 155.

In the above embodiment, the reference gas is atmospheric gas, but is not limited thereto so long as the gas serves as a reference for detecting the concentration of a specific gas in the measurement-object gas. For example, the space 149 may be filled with a gas that has been adjusted to a predetermined oxygen concentration (>the oxygen concentration of the measurement-object gas) as the reference gas.

In the above embodiment, the front surface (i.e., the part exposed to the sensor element chamber 133) of the sensor element 101 including the outer pump electrode 23 may be covered with a porous protective layer composed of a ceramic material, such as alumina.

In the above embodiment, the CPU 97 performs feedback control on the voltage Vp2 of the variable power source 46 so as to set the voltage V2 to the target value V2*, and detects the $NO_x$ concentration in the measurement-object gas based on the detection value (i.e., the pump current Ip2), but the configuration is not limited thereto. For example, the CPU 97 may control the measurement pump cell 41 (e.g., control the voltage Vp2) so as to set the pump current Ip2 to a fixed target value Ip2*, and detect the $NO_x$ concentration by using the detection value (i.e., the voltage V2). By controlling the measurement pump cell 41 so that the pump current Ip2 becomes the target value Ip2*, oxygen is pumped out from the third internal cavity 61 at a substantially fixed flow rate. Therefore, the oxygen concentration in the third internal cavity 61 changes in accordance with the amount of oxygen produced as a result of the $NO_x$ in the measurement-object gas being reduced in the third internal cavity 61, whereby the voltage V2 changes. Accordingly, the voltage V2 becomes a value according to the $NO_x$ concentration in the measurement-object gas. Therefore, the controller 96 can calculate the $NO_x$ concentration based on the voltage V2. In this case, for example, the correspondence relationship between the voltage V2 and the $NO_x$ concentration may be stored in advance in the storage unit 98.

In the above embodiment, the $NO_x$ concentration in the measurement-object gas is detected by the sensor element 101, but is not limited thereto so long as the concentration of a specific gas in the measurement-object gas is detected. For example, instead of $NO_x$, the concentration of another oxide may be detected as the specific gas concentration. If the specific gas is an oxide, oxygen is produced when the specific gas itself is reduced in the third internal cavity 61 similarly to the above embodiment, so that the measurement pump cell 41 can acquire a detection value (e.g., the pump current Ip2) according to this oxygen and detect the specific gas concentration. Furthermore, the specific gas may be a non-oxide, such as ammonia. If the specific gas is a non-oxide, the specific gas is converted into an oxide (e.g., is converted into NO in the case of ammonia), so that oxygen is produced when the converted gas is reduced in the third internal cavity 61. Thus, the measurement pump cell 41 can acquire a detection value (e.g., the pump current Ip2) according to this oxygen and detect the specific gas concentration. For example, the inner pump electrode 22 in the first internal cavity 20 functions as a catalyst, so that the ammonia can be converted into NO in the first internal cavity 20.

In the above embodiment, the element body of the sensor element 101 is a layered body having a plurality of solid electrolyte layers (i.e., layers 1 to 6), but is not limited thereto. The element body of the sensor element 101 may include at least one oxygen-ion-conductive solid electrolyte layer. For example, the layers 1 to 5 other than the second solid electrolyte layer 6 in FIG. 2 may be structural layers (e.g., layers composed of alumina) composed of a material other than that of solid electrolyte. In this case, the electrodes in the sensor element 101 may be disposed on the second solid electrolyte layer 6. For example, the measurement electrode 44 in FIG. 2 may be disposed on the lower surface of the second solid electrolyte layer 6. Moreover, the reference-gas introduction space 43 may be provided in the spacer layer 5 instead of the first solid electrolyte layer 4, and the reference-gas introduction layer 48 may be provided between the second solid electrolyte layer 6 and the spacer layer 5 instead of being provided between the first solid electrolyte layer 4 and the third substrate layer 3, and the reference electrode 42 may be provided rearward of the third internal cavity 61 and on the lower surface of the second solid electrolyte layer 6.

In the above embodiment, the outer pump electrode 23 serves as an outer main pump electrode disposed in a part of the main pump cell 21 to be exposed to the measurement-object gas at the outer side of the sensor element 101, an outer auxiliary pump electrode disposed in a part of the auxiliary pump cell 50 to be exposed to the measurement-object gas at the outer side of the sensor element 101, an outer measurement electrode disposed in a part of the measurement pump cell 41 to be exposed to the measurement-object gas at the outer side of the sensor element 101, and a measurement-object-gas side electrode disposed in a part of the reference-gas adjustment pump cell 90 to be exposed to the measurement-object gas at the outer side of the sensor element 101, but is not limited to thereto. At least one of the outer main pump electrode, the outer auxiliary pump electrode, the outer measurement electrode, and the measurement-object-gas side electrode may be provided at the outer side of the sensor element 101 in addition to the outer pump electrode 23.

In the above embodiment, the controller 96 sets (i.e., performs feedback control on) the target value V0* of the voltage V0 based on the pump current Ip1 so as to set the pump current Ip1 to the target value Ip1*, and performs feedback control on the pump voltage Vp0 so as to set the voltage V0 to the target value V0*, but may perform another type of control. For example, the controller 96 may perform feedback control on the pump voltage Vp0 based on the pump current Ip1 so as to set the pump current Ip1 to the target value Ip1*. Specifically, the controller 96 may omit the acquisition of the voltage V0 from the main-pump-control oxygen-partial-pressure detection sensor cell 80 and the setting of the target value V0*, and may directly control the pump voltage Vp0 (and by extension the pump current Ip0) based on the pump current Ip1.

Figure 9:
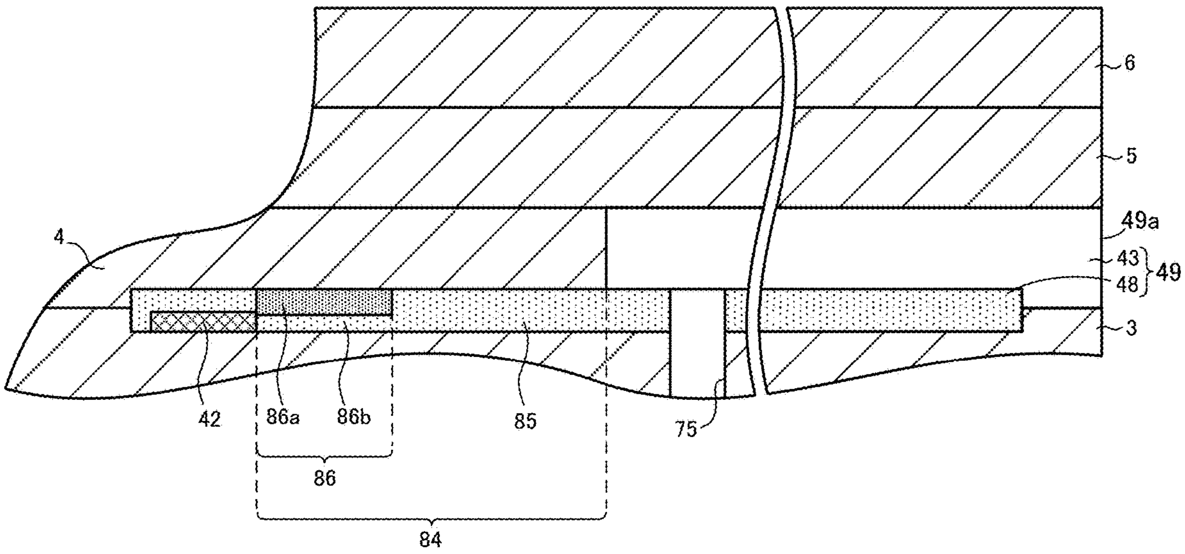
FIG. 9 is a partial cross-sectional view illustrating a reference-gas introduction layer 48 according to a modification.
Figure 10:
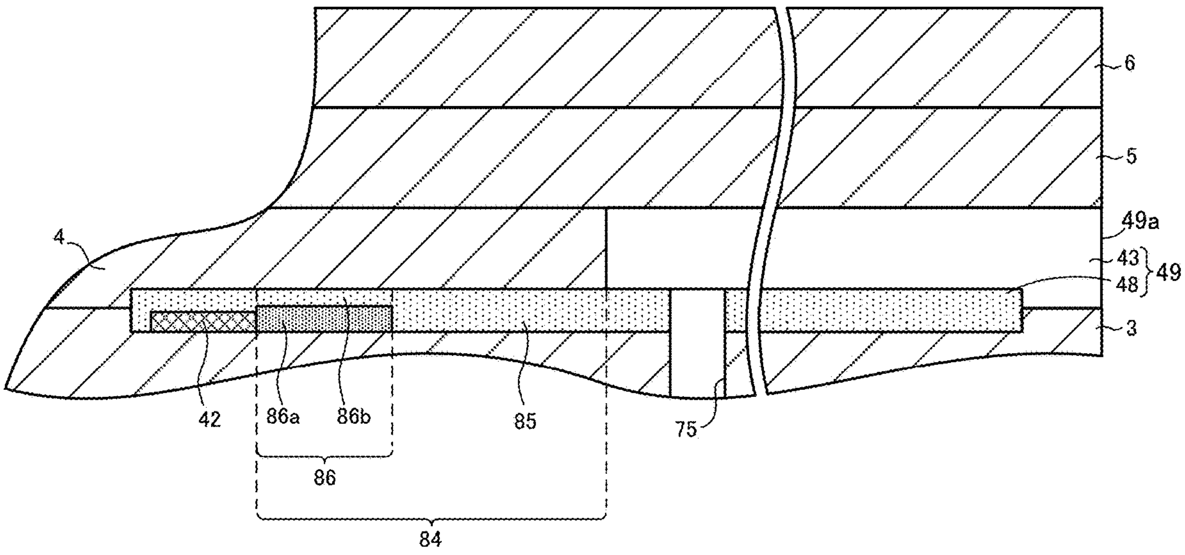
FIG. 10 is a partial cross-sectional view illustrating a reference-gas introduction layer 48 according to a modification.
Figure 11:
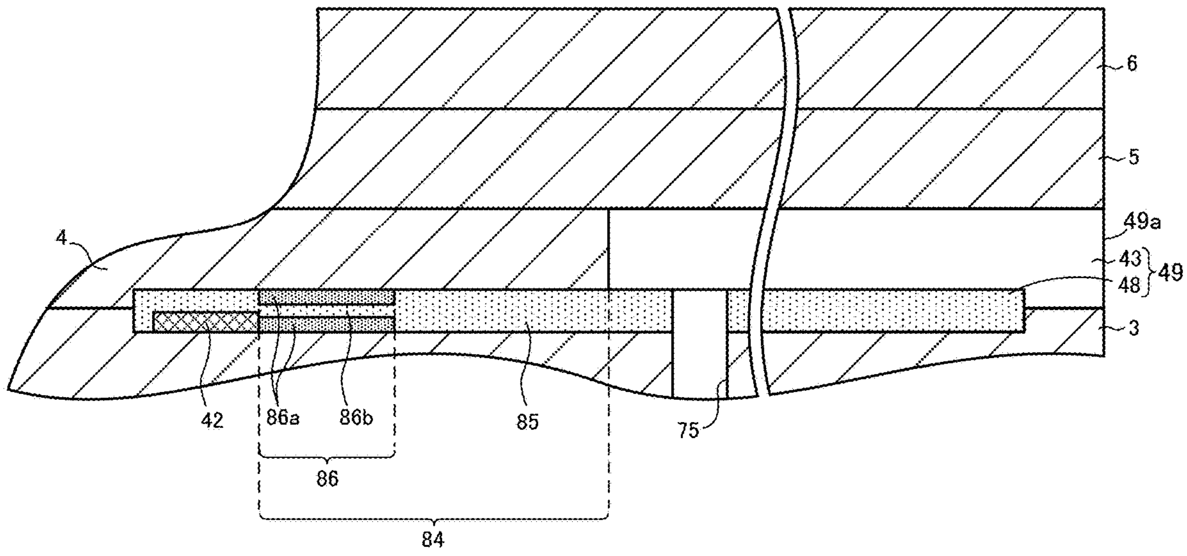
FIG. 11 is a partial cross-sectional view illustrating a reference-gas introduction layer 48 according to a modification.

In the case where the second porous region 86 has the low porosity region **86*a* and the high porosity region 86*b*, the low porosity region 86*a* and the high porosity region 86*b* may be arranged in the up-down direction, unlike FIG. 6. Specifically, the low porosity region 86*a* and the high porosity region 86*b* may be arranged in an overlapping manner in the thickness direction of the reference-gas introduction layer 48. For example, the configurations of reference-gas introduction layers 48 according to modifications shown in FIGS. 9 to 11 may be employed. In FIG. 9, the second porous region 86 has the low porosity region 86*a* and the high porosity region 86*b* disposed below the low porosity region 86*a*, and the low porosity region 86*a* and the high porosity region 86*b* overlap each other in the thickness direction (in this case, the up-down direction) of the reference-gas introduction layer 48. In FIG. 10, the second porous region 86 has the low porosity region 86*a* and the high porosity region 86*b* disposed above the low porosity region 86*a*. In FIG. 11, the second porous region 86 has two low porosity regions 86*a* and one high porosity region 86*b*, and the high porosity region 86*b* is interposed in the up-down direction between the two low porosity regions 86*a*. These configurations are similar to the above embodiment in being able to achieve the advantages in which the stabilization period of the sensor element 101 is shortened and the resistance of the sensor element 101 to contaminants is enhanced. When the low porosity region 86*a* and the high porosity region 86*b* are arranged in an overlapping manner in the thickness direction of the reference-gas introduction layer 48, as in each of FIGS. 9 to 11, a thickness T2a of the low porosity region 86*a* is preferably 50% or more of the thickness T2 of the second porous region 86, and more preferably 90% or more thereof. The resistance of the sensor element 101 to contaminants by the low porosity region 86*a* can be further enhanced as the percentage of the thickness T2a relative to the thickness T2, that is, the percentage of the low porosity region 86*a* in the second porous region 86 in the thickness direction, increases. In this case, the thickness T2a may be 95% or less of the thickness T2, so long as the thickness T2a is a value less than 100% of the thickness T2. If there are multiple low porosity regions 86*a*, as in FIG. 11, the total thickness is set as the thickness T2a. If the second porous region 86 does not have a fixed thickness, an average value may be set as the thickness T2. The same applies to the thickness T2a of the low porosity region 86*a*. As described with reference to FIG. 6, assuming that a diffusion resistance of the high porosity region 86*b* is defined as X [$mm^{-1}$] and a diffusion resistance of the low porosity region 86*a* is defined as Y [$mm^{-1}$] in the reference-gas introduction layer 48 in each of FIGS. 9 to 11**, the diffusion resistance X and the diffusion resistance Y can be regarded as being connected in parallel and can thus be calculated as the diffusion resistance $R2=1/(1/X+1/Y)$.

As described with reference to FIG. 6, the high porosity region **86*b* may be composed of the same material and have the same porosity as the first porous region 85 in the reference-gas introduction layer 48 in each of FIGS. 9 to 11. In this case, the patterns of the first porous region 85 and the high porosity region 86*b* may be collectively formed by screen printing during the manufacturing of the sensor element 101. Accordingly, regions other than the low porosity region 86*a* in the reference-gas introduction layer 48 (particularly, the path segment 84) can be integrally formed, so that a situation where the reference-gas introduction layer 48 is formed in a segmented fashion can be suppressed. For example, in the case where the entire second porous region 86 is the low porosity region 86*a*, as in FIG. 4, the second porous region 86 and the first porous region 85 in front thereof are formed separately, sometimes causing the reference-gas introduction layer 48 to be segmented in the front-rear direction due to a gap formed between the two regions. In contrast, when the patterns of the first porous region 85 and the high porosity region 86*b* are to be collectively formed in the reference-gas introduction layer 48 in each of FIGS. 9 to 11, segmentation of the reference-gas introduction layer 48 in the front-rear direction can be suppressed since a gap is not formed between the first porous region 85 and the high porosity region 86*b***.

EXAMPLES

Specific fabrication examples of gas sensors will be described below as examples. The present invention is not limited to the following examples.

Example 1

Example 1 is achieved by fabricating the gas sensor 100 shown in FIGS. 1 to 4 in accordance with the above-described manufacturing method. For fabricating the sensor element 101, each green sheet is obtained by mixing zirconia particles having 4 mol % of yttria added thereto as a stabilizer with an organic binder and an organic solvent, and then molding the mixture by tape molding. The green compacts 145*a* and 145*b* in FIG. 1 are obtained by molding talc powder. The reference-gas introduction space 43 is set to have a width of 0.5 mm, a length of 57.88 mm, and a thickness of 0.2 mm. Therefore, the diffusion resistance R0 (=length/(width x thickness)) of the reference-gas introduction space 43 is 578.8 $mm^{-1}$, and the diffusion resistance Rp0 per unit length is 10 $mm^{-2}$. The first porous region 85 is set to have a width W1 of 2.26 mm, a length L1 of 0.53 mm, a thickness T1 of 0.03 mm, and a porosity P1 of 40%. Therefore, the diffusion resistance R1 (=L1/(W1×T1×P1/100)) of the first porous region 85 is 20 $mm^{-1}$, and the diffusion resistance Rp1 per unit length is 36.87 $mm^{-2}$. The second porous region 86 (=low porosity region 86*a*) is set to have a width W2 of 2.26 mm, a length L2 of 0.6 mm, a thickness T2 of 0.03 mm, and a porosity P2 of 4%. Therefore, the diffusion resistance R2 (=L2/(W2×T2×P2/100)) of the second porous region 86 is 221.1 $mm^{-1}$, and the diffusion resistance Rp2 per unit length is 368.7 $mm^{-2}$. The ratio Rp1/Rp0 is 3.69, and the ratio Rp2/Rp1 is 10.00. The diffusion resistance Ra (=R0+R1+R2) of the reference-gas introduction section 49 is 820 $mm^{-1}$. The width Wr of the reference electrode 42 is set to 2.05 mm. The area ratio S2/Sw is 0.53.

Example 2

Example 2 is achieved by fabricating a gas sensor 100 similarly to Example 1 except that the length L1 of the first porous region 85 is reduced and the length L2 of the second porous region 86 (=low porosity region 86*a*) is increased, as shown in FIG. 5. The area ratio S2/Sw in Example 2 is 0.97.

Examples 3 and 4

Examples 3 and 4 are achieved by fabricating gas sensors 100 similarly to Examples 1 and 2 except that the length of the reference-gas introduction space 43 in the sensor element 101 is reduced to 41.88 mm (so that the length of the sensor element 101 is also reduced).

Examples 5 and 6

Examples 5 and 6 are achieved by fabricating gas sensors 100 similarly to Example 4 except that the porosity P2 of the second porous region 86 (=low porosity region 86*a*) is 2% and 2.5%, respectively.

Examples 7 to 9

Examples 7 to 9 are achieved by fabricating gas sensors 100 similarly to Example 3 except that the combination of the porosity P1 of the first porous region 85 and the porosity P2 of the second porous region 86 (=low porosity region 86*a*) is changed. In Example 7, the porosity P1 is set to 60%, and the porosity P2 is set to 1%. In Example 8, the porosity P1 is set to 40%, and the porosity P2 is set to 10%. In Example 9, the porosity P1 is set to 80%, and the porosity P2 is set to 8%.

Example 10

Example 10 is achieved by fabricating the gas sensor 100 equipped with the reference-gas introduction section 49 shown in FIG. 6. In Example 10, the width W2 of the low porosity region 86*a* is set to 2.034 mm, and the high porosity regions 86*b* and 86*c* are set to have a total width of 0.226 mm. Therefore, the second porous region 86 in Example 10 is set to have a width of 2.226 mm, as in Example 3. The high porosity regions 86*b* and 86*c* are set to have a porosity of 40%, which is the same as the porosity P1 of the first porous region 85. Example 10 is the same as Example 3 with regard to the remaining points. In Example 10, the diffusion resistance X of the high porosity regions 86*b* and 86*c* is 221.2 $mm^{-1}$ (=length of 0.6 mm/(width of 0.226 mm)× thickness of 0.03 mm×porosity of 40%/100)). The diffusion resistance Y of the low porosity region 86*a* is 246 $mm^{-1}$ (=length of 0.6 mm/(width of 2.034 mm×thickness of 0.03 mm×porosity of 4%/100)). Therefore, the diffusion resistance R2 (1/(1/X+1/Y)) of the second porous region 86 is 116.4 $mm^{-1}$. The diffusion resistance Rp2 per unit length of the second porous region 86 is 194.0 $mm^{-2}$. In Example 10, the area ratio S2/Sw is 0.48. Since the width W2 of the low porosity region 86*a* is 2.034 mm, the width W1 of the first porous region 85 is 2.226 mm, and the width Wr of the reference electrode 42 is 2.05 mm, the width W2 is 91% of the width W1 and 99% of the width Wr.

Example 11

Example 11 is achieved by fabricating the gas sensor 100 equipped with the reference-gas introduction section 49 shown in FIG. 7. In Example 11, the length L1 of the first porous region 85 is set to 0.4 mm, the length L2 of the second porous region 86 (=low porosity region 86*a*) is set to 0.63 mm, and the length of the third porous region 87 is set to 0.1 mm. The width, the thickness, and the porosity P3 of the third porous region 87 are the same as the width W1, the thickness T1, and the porosity P1 of the first porous region 85. Example 11 is the same as Example 3 with regard to the remaining points. In Example 11, the diffusion resistance R1 of the first porous region 85 is 15 $mm^{-1}$, and the diffusion resistance Rp1 per unit length is 36.87 $mm^{-2}$. The diffusion resistance R2 of the second porous region 86 is 232.3 $mm^{-1}$, and the diffusion resistance Rp1 per unit length is 368.7 $mm^{-2}$. A diffusion resistance R3 of the third porous region 87 is 3.69 $mm^{-2}$. The diffusion resistance Ra (=R0+R1+R2+R3) of the reference-gas introduction section 49 is 670 $mm^{-1}$. In Example 11, the area ratio S2/Sw is 0.56.

Example 12

Example 12 is achieved by fabricating the gas sensor 100 equipped with the reference-gas introduction section 49 shown in FIG. 9. In Example 12, the thickness T2 of the second porous region 86 is set to 0.03 mm, as in Example 3, the thickness T2a of the low porosity region 86*a* is set to 0.027 mm, and the thickness of the high porosity region 86*b* is set to 0.003 mm. Therefore, in Example 12, the thickness T2a is set to 90% of the thickness T2. The porosity P2 of the low porosity region 86*a* is set to 4%, as in Example 3, and the porosity of the high porosity region 86*b* is set to 40%, which is the same as the porosity P1 of the first porous region 85. Example 12 is the same as Example 3 with regard to the remaining points. In Example 12, the diffusion resistance X of the high porosity region 86*b* is 221.2 $mm^{-1}$ (=length of 0.6 mm/(width of 2.26 mm x thickness of 0.003 mm×porosity of 40%/100)). The diffusion resistance Y of the low porosity region 86*a* is 246 $mm^{-1}$ (=length of 0.6 mm/(width of 2.26 mm×thickness of 0.027 mm×porosity of 4%/100)). Therefore, the diffusion resistance R2 (=1/(1/X+1/Y)) of the second porous region 86 is 116.4 $mm^{-1}$. The diffusion resistance Rp2 per unit length of the second porous region 86 is 194.1 $mm^{-2}$.

Examples 13 and 14

Examples 13 and 14 are achieved by fabricating gas sensors 100 similarly to Example 12 except that the thickness T2 of the second porous region 86 is not changed and that the thickness T2a of the low porosity region 86*a* and the thickness of the high porosity region 86*b* are changed. In Example 13, the thickness T2a is set to 80% of the thickness T2. In Example 14, the thickness T2a is set to 50% of the thickness T2.

Example 15

Example 15 is achieved by fabricating the gas sensor 100 equipped with the reference-gas introduction section 49 shown in FIG. 11. In Example 15, the thickness of each of the two low porosity regions 86*a* is set to 0.0135 mm. Therefore, the thickness T2a, that is, the total thickness of the two low porosity regions 86*a*, is 0.027 mm, which is the same as the thickness T2a in Example 12. Example 15 is the same as Example 12 with regard to the remaining points.

Comparative Example 1

Comparative Example 1 is achieved by fabricating a gas sensor 100 similarly to Example 1 except that the reference-gas introduction layer 48 does not include the low porosity region 86*a* and that the path segment 84 in FIG. 4 is entirely constituted of the first porous region 85.

Comparative Example 2

Comparative Example 2 is achieved by fabricating a gas sensor 100 similarly to Comparative Example 1 except that the thickness of the reference-gas introduction space 43 is set to 0.03 mm, which is the same as the thickness T1 of the first porous region 85, and that the reference-gas introduction space 43 is filled with a porous layer with a porosity of 40%, which is the same as that of the first porous region 85. In other words, the gas sensor 100 in Comparative Example 2 is obtained by replacing the low porosity region 86*a* and the reference-gas introduction space 43 in Example 1 with a porous layer having the same thickness and the same porosity as the first porous region 85.

Comparative Example 3

Comparative Example 3 is achieved by fabricating a gas sensor 100 identical to that in Comparative Example 1 except that the width of the reference-gas introduction space 43 is set to 0.25 mm.

Comparative Example 4

Comparative Example 4 is achieved by fabricating a gas sensor 100 identical to that in Example 3 except that the thickness of the reference-gas introduction space 43 is set to 0.03 mm, which is the same as the thickness T2 of the low porosity region 86*a*, that the reference-gas introduction space 43 is filled with a porous layer with a porosity of 4%, which is the same as that of the low porosity region 86*a*, and that the porosity P1 of the first porous region 85 is set to 4%, which is the same as the porosity P2 of the low porosity region 86*a*.

[Evaluation Test 1: Evaluation of Stabilization Period]

The gas sensor 100 according to Example 1 is stored in a thermos-hygrostat for one week at a temperature of 40° C. and a humidity of 85%, and water is caused to adsorb to the reference-gas introduction layer 48. Then, the gas sensor 100 according to Example 1 is attached to a pipe. A model gas having nitrogen as a base gas and with an oxygen concentration of 0% and $NO_x$ concentration of 1500 ppm is prepared, and is caused to flow as a measurement-object gas through the pipe. In this state, the sensor element 101 is driven by the control device 95. In detail, the control device 95 applies electricity to the heater 72 to heat the sensor element 101, and maintains the temperature of the sensor element 101 at 800° C. Furthermore, the control device 95 is continuously controlling the aforementioned pump cells 21, 41, and 50 and acquiring the voltages V0, V1, V2, and Vref from the aforementioned sensor cells 80 to 83. The reference-gas adjustment pump cell 90 is not actuated. The aforementioned state from when the driving (i.e., the heating) of the sensor element 101 is started is maintained for 60 minutes. During that time, the pump current Ip2 is continuously measured. With a value of the pump current Ip2 after a lapse of 60 minutes from the start of the measurement being defined as a reference value (100%), the rate of change in a reference value of the value of the pump current Ip2 after a lapse of 10 minutes from the start of the measurement is calculated. The rate of change in the pump current Ip2 is calculated similarly for each of Examples 2 to 11 and 12 to 15 and Comparative Examples 1 to 4. Until the water in the reference-gas introduction layer 48 is released from when the driving of the sensor element 101 is started, the water in the gaseous state exists, thus causing the oxygen concentration around the reference electrode 42 to decrease. Therefore, the potential of the reference electrode 42 is not stable. This means that, until the potential of the reference electrode 42 becomes stable, the pump current Ip2 is not stable even if the $NO_x$ concentration of the measurement-object gas is constant. As the rate of change in the pump current Ip2 becomes lower, it is conceivable that the water has been sufficiently released from the reference-gas introduction layer 48 when 10 minutes have elapsed from the start of the measurement, and that the potential of the reference electrode 42 is stable. Accordingly, the stabilization period serving as a time period from when the driving of the sensor element 101 is started to when the potential of the reference electrode 42 becomes stable can be evaluated as being long or short in accordance with the magnitude of the rate of change. When the calculated rate of change is 3% or lower, it is determined that the stabilization period is extremely short ("A"). When the calculated rate of change exceeds 3% but is 5% or lower, it is determined that the stabilization period is short ("B"). If the calculated rate of change exceeds 5%, it is determined that the stabilization period is long ("F").

[Evaluation Test 2: Evaluation of Resistance to Contaminants]

The gas sensor 100 according to Example 1 is disposed in the air, and the sensor element 101 is heated to 800° C. by applying electricity to the heater 72. Voltage is not applied to any of the variable power sources 24, 46, and 52. In this state, a voltage Vp3 is applied between the outer pump electrode 23 and the reference electrode 42 by the power supply circuit 92 so that oxygen is pumped out from around the reference electrode 42 to around the outer pump electrode 23. In this case, the pump current Ip3 flowing between the electrodes 23 and 42 is measured. The voltage Vp3 is a direct-current voltage. Subsequently, the pump current Ip3 gradually increases as the voltage Vp3 is gradually increased, but when the voltage Vp3 applied reaches a certain value or larger, the pump current Ip3 does not increase anymore and reaches an upper limit even if the voltage Vp3 is increased. This upper limit of the pump current Ip3 is measured as a limiting current value. The limiting current value of the pump current Ip3 is measured similarly for each of Examples 2 to 11 and 12 to 15 and Comparative Examples 1 to 4. The limiting current value of the pump current Ip3 has a correlation with the inflow of gas flowing from the entrance 49*a* of the reference-gas introduction section 49 to the reference electrode 42. Therefore, in accordance with the magnitude of the limiting current value, the magnitude of the inflow of contaminant gas (gas containing a contaminant) traveling through the reference-gas introduction section 49 from outside the sensor element 101 and reaching the reference electrode 42 can be evaluated, and by extension, the resistance to contaminants can be evaluated. When the measured limiting current value is lower than 20 μA, it is determined that the resistance to contaminants is extremely high ("A"). When the measured limiting current value is 20 μA or higher but lower than 30 μA, it is determined that the resistance to contaminants is high ("B"). When the measured limiting current value is 30 μA or higher, it is determined that the resistance to contaminants is low ("F").

Table 1 shows the diffusion resistances R0, Rp0, R1, Rp1, R2, and Rp2, the ratio Rp1/Rp0, the ratio Rp2/Rp1, the diffusion resistance Ra, the evaluation result for the stabilization period, and the evaluation result for the resistance to contaminants for each of Examples 1 to 11 and 12 to 15 and Comparative Examples 1 to 4. In Table 1, since each of Comparative Examples 1 to 3 does not have the low porosity region 86*a*, there are no values ("-") for the diffusion resistances R2 and Rp2 and the ratio Rp2/Rp1. The values for the diffusion resistances R0 and Rp0 in Comparative Example 4 each indicate the diffusion resistance value of the porous layer filling the reference-gas introduction space 43.

TABLE 1

| | Reference-gas introduction space | | First porous region | | Second porous region | |
|---|---|---|---|---|---|---|
| | Diffusion resistance R0 [mm$^{-1}$] | Diffusion resistance Rp0 per unit length [mm$^{-2}$] | Diffusion resistance R1 [mm$^{-1}$] | Diffusion resistance Rp1 per unit length [mm$^{-2}$] | Diffusion resistance R2 [mm$^{-1}$] | Diffusion resistance Rp2 per unit length [mm$^{-2}$] |
| Examples 1 | 578.8 | 10 | 20 | 36.87 | 221.2 | 368.7 |
| Examples 2 | 578.8 | 10 | 1 | 36.87 | 405.6 | 368.7 |
| Examples 3 | 418.8 | 10 | 20 | 36.87 | 221.2 | 368.7 |
| Examples 4 | 418.8 | 10 | 1 | 36.87 | 405.6 | 368.7 |
| Examples 5 | 418.8 | 10 | 1 | 36.87 | 811.2 | 737.5 |
| Examples 6 | 418.8 | 10 | 1 | 36.87 | 649.0 | 590.0 |
| Examples 7 | 418.8 | 10 | 13 | 24.58 | 885.0 | 1474.9 |
| Examples 8 | 418.8 | 10 | 20 | 36.87 | 88.5 | 147.5 |
| Examples 9 | 418.8 | 10 | 10 | 18.44 | 110.6 | 184.4 |
| Examples 10 | 418.8 | 10 | 20 | 36.87 | 116.4 | 194.0 |
| Examples 11 | 418.8 | 10 | 15 | 36.87 | 232.3 | 368.7 |
| Examples 12 | 418.8 | 10 | 20 | 36.87 | 116.4 | 194.1 |
| Examples 13 | 418.8 | 10 | 20 | 36.87 | 79.0 | 131.7 |
| Examples 14 | 418.8 | 10 | 20 | 36.87 | 40.2 | 67.0 |
| Examples 15 | 418.8 | 10 | 20 | 36.87 | 116.4 | 194.1 |
| Comparative Example 1 | 578.8 | 10 | 42 | 36.87 | — | — |
| Comparative Example 2 | 9646.7 | 166.7 | 42 | 36.87 | — | — |
| Comparative Example 3 | 1157.6 | 20 | 42 | 36.87 | — | — |
| Comparative Example 4 | 69800 | 1666.7 | 195 | 368.73 | 221.2 | 368.7 |

| | Ratio Rp1/Rp0 | Ratio Rp2/Rp1 | Reference-gas introduction section Diffusion resistance Ra [mm$^{-1}$] | Evaluation of Stabilization Period | Evaluation of Resistance to Contaminants |
|---|---|---|---|---|---|
| Examples 1 | 3.69 | 10.00 | 820 | A | A |
| Examples 2 | 3.69 | 10.00 | 986 | A | A |
| Examples 3 | 3.69 | 10.00 | 660 | A | A |
| Examples 4 | 3.69 | 10.00 | 826 | A | A |
| Examples 5 | 3.69 | 20.00 | 1231 | B | A |
| Examples 6 | 3.69 | 16.00 | 1069 | A | A |
| Examples 7 | 2.46 | 60.00 | 1317 | B | A |
| Examples 8 | 3.69 | 4.00 | 527 | A | B |
| Examples 9 | 1.84 | 10.00 | 539 | A | B |
| Examples 10 | 3.69 | 5.26 | 555 | A | A |
| Examples 11 | 3.69 | 10.00 | 670 | A | A |

TABLE 1-continued

| | | | | | |
|---|---|---|---|---|---|
| Examples 12 | 3.69 | 5.26 | 555 | A | A |
| Examples 13 | 3.69 | 3.57 | 517 | A | B |
| Examples 14 | 3.69 | 1.82 | 479 | A | B |
| Examples 15 | 3.69 | 5.26 | 555 | A | A |
| Comparative Example 1 | 3.69 | — | 620 | A | F |
| Comparative Example 2 | 0.22 | — | 9688 | F | A |
| Comparative Example 3 | 1.84 | — | 1199 | A | F |
| Comparative Example 4 | 0.22 | 1.00 | 70217 | F | A |

As shown in Table 1, in each of Examples 1 to 11 and 12 to 15 having the first porous region 85 and the low porosity region 86*a* with a lower porosity than the first porous region 85 in the path segment 84 and having the second porous region 86 disposed closer to the reference electrode 42 relative to the first porous region 85, the evaluation result for the stabilization period indicates "A" or "B" and the evaluation result for the resistance to contaminants indicates "A" or "B". Specifically, each of Examples 1 to 11 and 12 to 15 achieves a short stabilization period and high resistance to contaminants. In contrast, in each of Comparative Examples 1 and 3 not equipped with the low porosity region 86*a*, a high evaluation result is obtained for the stabilization period, but the evaluation result for the resistance to contaminants indicates "F". In each of Comparative Examples 2 and 4, a high evaluation result is obtained for the resistance to contaminants, but the evaluation result for the stabilization period indicates "F". Although the low porosity region 86*a* is not equipped in Comparative Example 2, since a porous layer with a porosity of 40%, which is the same as that of the first porous region 85, fills the reference-gas introduction space 43, the diffusion resistance Ra of the reference-gas introduction section 49 is a high value. Accordingly, in Comparative Example 2, it is conceivable that the stabilization period is long since the water in the reference-gas introduction section 49 is less likely to be released. In Comparative Example 4, since the porous body in the reference-gas introduction section 49 and the first porous region 85 are both porous bodies with a low porosity, like the low porosity region 86*a*, the diffusion resistance Ra is a higher value than in Comparative Example 2. Accordingly, in Comparative Example 4, it is conceivable that the stabilization period is long since the water in the reference-gas introduction section 49 is less likely to be released. In Comparative Examples 1 and 3, the value of the diffusion resistance Ra of the entire reference-gas introduction section 49 is about the same as that in Examples 1 to 11 and 12 to 15, but the resistance to contaminants is lower than that in Examples 1 to 11 and 12 to 15. In Comparative Examples 2 and 4, it is conceivable that the resistance to contaminants is favorable due to the value of the diffusion resistance Ra being high, but in exchange, the stabilization period is long. Based on comparisons with these comparative examples, since each of Examples 1 to 11 and 12 to 15 has the low porosity region 86*a*, high resistance to contaminants can be achieved without having to greatly increase the diffusion resistance Ra of the entire reference-gas introduction section 49. Since the diffusion resistance Ra is not high, it is conceivable that a long stabilization period can be suppressed.

Based on comparisons among Examples 1 to 4, 9, and 11 in which the ratio Rp2/Rp1 and the diffusion resistance Ra are about the same, it is conceivable that the ratio Rp1/Rp0 is preferably 2 or higher since the resistance to contaminants becomes higher. Based on comparisons among Examples 1 to 4, 8, and 11 in which the ratio Rp1/Rp0 and the diffusion resistance Ra are about the same, it is conceivable that the ratio Rp2/Rp1 is preferably 5 or higher since the resistance to contaminants becomes higher. In Example 7, the evaluation result for the stabilization period indicates "B" when the ratio Rp2/Rp1 is 60, so that it is conceivable that the ratio Rp2/Rp1 is preferably 50 or lower. Based on comparisons among Examples 1 to 7, it is conceivable that the diffusion resistance Ra is preferably 1200 $mm^{-1}$ or lower since the stabilization period becomes shorter. In Comparative Example 3, the diffusion resistance Ra is 1199 $mm^{-1}$, and the evaluation result for the stabilization period indicates "A".

In Examples 1 to 9 and 11, the width W2 of the low porosity region 86*a* is equal to the width W1 and is larger than the width Wr. In contrast, in Example 10, the width W2 of the low porosity region 86*a* is small. In detail, the width W2 is 91% of the width W1, and 99% of the width Wr. In Example 10, since the evaluation result for the resistance to contaminants indicates "A", if at least the width W2 is 90% or more of the width W1 and 90% or more of the width Wr, it is conceivable that the effect for enhancing the resistance to contaminants by the low porosity region 86*a* can be achieved.

The area ratio S2/Sw in each of Examples 1, 3, and 7 to 9 is 0.53, the area ratio S2/Sw in each of Examples 2 and 4 to 6 is 0.97, the area ratio S2/Sw in Example 10 is 0.48, and the area ratio S2/Sw in Example 11 is 0.56. Since the stabilization period is short and the resistance to contaminants is high in each of Examples 1 to 11, if at least the area ratio S2/Sw is 0.45 or higher, that is, if the area S2 is 45% or more of the area Sw, it is conceivable that the effect for enhancing the resistance to contaminants by the low porosity region 86*a* can be achieved.

It is confirmed from the results in Examples 12 to 15 that the evaluation result for the resistance to contaminants indicates "A" or "B" when at least the thickness T2a is 50% or more of the thickness T2. Furthermore, based on comparisons between Examples 12 and 15 and Examples 13 and 14, it is conceivable that the thickness T2a is preferably 90% or more of the thickness T2.

What is claimed is:

1. A sensor element comprising:

an element body having an oxygen-ion-conductive solid electrolyte layer and provided therein with a measurement-object gas flow section, the measurement-object gas flow section receiving a measurement-object gas and causing the measurement-object gas to flow therethrough;

a measurement electrode disposed in the measurement-object gas flow section;

a reference electrode disposed inside the element body;

a reference-gas introduction section having a reference-gas introduction space and a porous reference-gas introduction layer, the reference-gas introduction space being open outward of the element body and introducing a reference gas serving as a reference for detecting a specific gas concentration in the measurement-object gas into the element body, the porous reference-gas introduction layer causing the reference gas to flow from the reference-gas introduction space to the reference electrode; and a heater that heats the element body, wherein the reference-gas introduction layer has a first porous region and a second porous region in a path of the reference gas between the reference-gas introduction space and the reference electrode, the second porous region having a low porosity region with a lower porosity than the first porous region and being disposed closer to the reference electrode relative to the first porous region.

2. The sensor element according to claim 1, wherein a ratio Rp2/Rp1 between a diffusion resistance Rp1 per unit length of the first porous region and a diffusion resistance Rp2 per unit length of the second porous region is between 5 and 50 inclusive.

3. The sensor element according to claim 1, wherein a ratio Rp1/Rp0 between a diffusion resistance Rp0 per unit length of the reference-gas introduction space and a diffusion resistance Rp1 per unit length of the first porous region is between 2 and 10 inclusive.

4. The sensor element according to claim 1, wherein a diffusion resistance Ra of the reference-gas introduction section is 1200 $mm^{-1}$ or lower.

5. The sensor element according to claim 1, wherein a width W2 of the low porosity region is 90% or more of a width W1 of the first porous region and 90% or more of a width Wr of the reference electrode.

6. The sensor element according to claim 1, wherein, in plan view, an area S2 of the low porosity region is 45% or more of an area Sw of a segment between the reference-gas introduction space and the reference electrode in the reference-gas introduction layer.

7. The sensor element according to claim 1, wherein the second porous region has the low porosity region and a high porosity region with a porosity higher than or equal to a porosity of the first porous region, and wherein the low porosity region and the high porosity region are arranged in an overlapping manner in a thickness direction of the reference-gas introduction layer.

8. The sensor element according to claim 7, wherein a thickness T2a of the low porosity region is 50% or more of a thickness T2 of the second porous region.

9. The sensor element according to claim 7, wherein a thickness T2a of the low porosity region is 90% or more of a thickness T2 of the second porous region.

10. A gas sensor comprising the sensor element according to claim 1.

11. The sensor element according to claim 2, wherein a diffusion resistance Ra of the reference-gas introduction section is 1200 $mm^{-1}$ or lower.

12. The sensor element according to claim 2, wherein a width W2 of the low porosity region is 90% or more of a width W1 of the first porous region and 90% or more of a width Wr of the reference electrode.

13. The sensor element according to claim 2, wherein, in plan view, an area S2 of the low porosity region is 45% or more of an area Sw of a segment between the reference-gas introduction space and the reference electrode in the reference-gas introduction layer.

14. The sensor element according to claim 3, wherein a diffusion resistance Ra of the reference-gas introduction section is 1200 $mm^{-1}$ or lower.

15. The sensor element according to claim 3, wherein a width W2 of the low porosity region is 90% or more of a width W1 of the first porous region and 90% or more of a width Wr of the reference electrode.

16. The sensor element according to claim 3, wherein, in plan view, an area S2 of the low porosity region is 45% or more of an area Sw of a segment between the reference-gas introduction space and the reference electrode in the reference-gas introduction layer.

17. The sensor element according to claim 2, wherein the second porous region has the low porosity region and a high porosity region with a porosity higher than or equal to a porosity of the first porous region, and wherein the low porosity region and the high porosity region are arranged in an overlapping manner in a thickness direction of the reference-gas introduction layer.

18. The sensor element according to claim 17, wherein a thickness T2a of the low porosity region is 50% or more of a thickness T2 of the second porous region.

19. The sensor element according to claim 17, wherein a thickness T2a of the low porosity region is 90% or more of a thickness T2 of the second porous region.

* * * * *